United States Patent

Norman et al.

[11] Patent Number: 6,049,533
[45] Date of Patent: *Apr. 11, 2000

[54] NETWORK COMMUNICATION SYSTEM WITH INFORMATION REROUTING CAPABILITIES

[75] Inventors: Stuart G. Norman, Don Mills, Canada; Marvin Sojka, Doylestown, Ohio

[73] Assignee: Aironet Wireless Communications, Inc., Fairlawn, Ohio

[*] Notice: This patent is subject to a terminal disclaimer.

[21] Appl. No.: 09/030,717

[22] Filed: Feb. 25, 1998

Related U.S. Application Data

[63] Continuation of application No. 08/539,130, Oct. 4, 1995, Pat. No. 5,737,328.

[51] Int. Cl.[7] .................................................. H04Q 7/00
[52] U.S. Cl. ........................ 370/328; 370/337; 370/347; 370/404
[58] Field of Search .................................. 370/328–331, 370/338, 349, 389, 395, 400–406, 339, 342, 344, 347, 350, 353, 356, 386, 392, 396; 455/435, 436, 428, 445

[56] References Cited

U.S. PATENT DOCUMENTS

| 5,490,139 | 2/1996 | Baker et al. | 370/401 |
| 5,528,583 | 6/1996 | Acampora et al. | 370/397 |
| 5,546,397 | 8/1996 | Mahany | 370/310 |
| 5,570,366 | 10/1996 | Baker et al. | 370/312 |
| 5,572,528 | 11/1996 | Shuen | 370/402 |
| 5,590,125 | 12/1996 | Acampora et al. | 370/329 |
| 5,636,217 | 6/1997 | Moelard | 370/338 |

*Primary Examiner*—Dang Ton
*Assistant Examiner*—Phirin Sam
*Attorney, Agent, or Firm*—Arter & Hadden LLP

[57] ABSTRACT

A network communication system in which access points providing wireless access to the system reroute misrouted information packets in the event the location of a mobile unit has changed. Regardless of whether a host computer or other network device is capable of updating in its position table the changing locations of the mobile units, information packets directed to the mobile units from the host computer or other network device are still properly delivered.

21 Claims, 19 Drawing Sheets

NETWORK COMMUNICATION SYSTEM WITH INFORMATION REROUTING CAPABILITIES

This application is a Continuation of U.S. application Ser. No. 08/539,130, filed Oct. 4, 1995, of Norman et al., now U.S. Pat. No. 5,737,328.

TECHNICAL FIELD

The present invention relates generally to network communication systems, such as local area networks (LANs), and more particularly to network communication systems which are accessed by one or more mobile communication units. Even more particularly, the present invention relates to network communication systems in which misrouted information packets are automatically rerouted to the mobile communication units regardless of their changing locations.

BACKGROUND OF THE INVENTION

In recent years, the use of communication systems having wireless mobile units which communicate using an optical or radio link with a hardwired network, such as a local area network (LAN), has become quite widespread. Retail stores and warehouses, for example, may use such systems to track inventory and replenish stock. Employees may enter inventory information using a handheld or portable mobile communication unit which can be carried throughout the store or warehouse. In manufacturing facilities, such systems are useful for tracking parts, completed products and defects. In a medical environment, these systems can reduce the time needed to fill out forms and eliminate inaccuracies by allowing medical personnel to transmit data directly from a mobile communication unit carried by the medical personnel.

Referring to FIG. 1A, an example of a conventional communication system is designated 20 and generally includes a number of fixed access points 21 interconnected by a cable medium 22 to form a hardwired network. The hardwired network, known as a backbone, may be a twisted pair cable, shielded coaxial cable or fiber optic lines, for example. Each access point 21 has a cell or service area which is defined as the area surrounding the access point 21 within which it has the ability to transmit and to receive relatively error-free data from a mobile communication unit MU within the area. In many instances, the cell is not circular because physical objects within the cell may partially block data signals creating "dead spots" within the area surrounding the access point 21. Also, machinery located in the vicinity of the access point 21 may generate excessive noise levels that degrade the quality of transmissions between the access points 21 and the mobile communication units MU.

In such a network, a mobile communication unit MU (also referred to herein as a "mobile unit") communicates with a host computer 36 by wirelessly transmitting a packet of data to the access point 21. The access point 21 then transmits the packet on the hardwired network to the host computer 36. The host computer 36 communicates with the mobile unit MU by transmitting a packet to the access point 21 to which the mobile unit MU is considered to be registered. The access point 21 then wirelessly transmits the packet to the mobile unit MU. The mobile unit MU communicates to the network through one access point 21 at a time. This access point is the access point 21 with which the mobile unit is registered. Because the mobile unit MU may move from cell to cell, however, it generally is able to change its access point registration.

When a mobile unit MU is powered up, it "registers" with an access point 21. However, as the location of this mobile unit MU changes, the mobile unit MU may register with another access point 21, thereby resulting in a deregistration with the previous access point 21. Further, deregistration will sometimes occur if there is no communication between the mobile unit MU and its corresponding access point 21 within a predetermined period of time.

Because the mobile unit MU may roam from cell to cell and change its access point registration, the network protocol must provide a system 20 for assuring that a packet addressed to the mobile unit MU is sent to the correct access point 21 for broadcast to the mobile unit MU. To provide this assurance, current networks utilize a non-source routed protocol.

For example, FIG. 1A shows a typical non-source routed Ethernet network. Communication over such a network occurs when a network device places a packet of data (also referred to herein as an information packet, or simply a packet) on the network. Network devices can place information on the Ethernet any time there is no other communication occurring. When a packet is placed onto the network, every device on the network will simultaneously receive the packet and view the destination address or addresses. The destinations that are specified in the packet will copy the packet into their memory for further processing. All other devices on the network will ignore the packet.

Each access point 21 on the Ethernet system maintains a registration table indicating which mobile units are currently within the service area of the access point. Given that every access point 21 has the opportunity to view all packets placed onto the network, each access point 21 is able to check its registration table and determine whether a specific mobile unit MU is currently registered. If a mobile unit MU roams from cell to cell, only the access point 21 with which the mobile unit MU is currently registered to will copy the frame and transmit it to the mobile unit MU. Thus, continuous communication with a roaming mobile unit MU is possible.

There may be instances while roaming that a mobile unit MU is not currently registered to any access point. In some Ethernet access points, a mail forwarding routine has been developed to handle such situation. However, such mail forwarding routine involves an access point with which a mobile unit MU was previously registered storing packets intended for the mobile unit. When the mobile unit MU later registers with a new access point, the access point with which the mobile unit MU was previously registered simply places the stored information back onto the bus from which it was received. There is no rerouting of the stored information.

The problem associated with non-source routed networks such as the system 20 shown in FIG. 1A is that sending all packets to all possible destinations is inefficient and reduces total throughput in a heavily loaded system. Therefore, source routed networks have been developed.

For example, in a source routed network such as the multiple token ring network shown in FIG. 1B, packets are not regularly transmitted to every device on the network. Rather, the source routing field in the packet designates the path a packet should take in order to reach its final destination. In particular, the source routing field consists of an ordered list of ring and bridge numbers which set out the entire path needed for a given packet to reach its destination from a source device on the network.

The problem with a communication system having a source routed network occurs when the system is used in conjunction with wireless mobile units MU. In particular, if a mobile unit MU roams from an area serviced by a first access point 21 on a first token ring to an area serviced by a second access point 21 on second token ring, packets addressed-to this mobile unit MU may still be routed to the first access point 21 on the first token ring. For example, typically the host computer 36 on the source routed network as shown in FIG. 1B will be configured to transmit packets to the mobile units based on one or both of the following approaches. In one case, the host computer 36 has stored therein a fixed position table indicating the location of the various rings on the network. In the event a mobile unit MU transmits a packet to the host computer 36 via an access point 21 on a given ring, the host computer 36 will respond to the mobile unit MU by directing a packet back to the same ring based on the location information in its position table. Alternatively, the host computer 36 may simply reverse the order of the source routing information in the packet received from the mobile unit MU. In either case, however, the destination ring of the packet transmitted by the host computer 36 is based on the ring location of the access point 21 that transmitted the packet for the mobile unit MU. Since the mobile unit MU may have since moved, this ring may not always be the correct location to which packets should be transmitted. Thus, the destination may not be able to maintain effective communication with the mobile unit MU to which the packet is directed.

Many establishments already have source routed networks such as that shown in FIG. 1B installed to perform a variety of functions. It would be very expensive and time consuming to reconfigure the system such that network devices which may be transmitting information to the mobile units MU are kept apprised of the location of each of the mobile units MU so as to avoid the loss of data. This is particularly true with respect to the host computer 36 which typically is the heart of the system and would need significant reprogramming and reconfiguration. The same may also be true with respect to the other devices on the network which may need to communicate with the mobile units MU and access points 21 such as a controller, cash register, etc. Accordingly, there is a strong need in the art for a network system, particularly one utilizing source routing, which does not require extensive reconfiguration of the host computer or other network devices which may need to communicate with the mobile units and access points. In particular, there is a strong need in the art for a means in which such systems can quickly and inexpensively be configured to ensure that packets addressed to a mobile unit reaches the mobile unit independent of which access point the mobile unit is currently registered.

SUMMARY OF THE INVENTION

The present invention relates to a network communication system in which the access points providing wireless access to the system reroute misrouted information packets in the event the location of a mobile unit has changed. Regardless of whether a host computer or other network device is capable of updating in its position table the changing locations of the mobile units, information packets directed to the mobile units from the host computer or other network device are still properly delivered.

In a preferred embodiment, each of the access points in the system maintains communication with the other access points and informs the other access points when a mobile unit has registered with it. A "current location" table is maintained in the memory of each access point to keep track of where mobile units in the system are currently located. Based on this information, the access points automatically reroute misdirected information packets to the access point with which the mobile unit is currently registered.

According to one particular aspect of the invention, a network communication system is provided having a communication network including a plurality of nodes, and a plurality of access points each coupled to the communication network at a respective one of the nodes, the access points serving as communication links between the communication network and one or more mobile communication units, and wherein each of the access points includes: wireless communication means for communicating information between the respective node and any of the one or more mobile communication units which are registered to the access point, means for receiving an information packet from the communications network, the information packet being addressed to a particular one of the one or more mobile communication units; means for transmitting the information packet to the particular mobile communication unit, via the wireless communication means, in the event the particular mobile communication unit is currently registered to the access point; and means for rerouting the information packet to the particular mobile communication unit via the communication network in the event the particular mobile communication unit is not currently registered to the access point.

According to another aspect of the invention, in a network communication system comprising a communication network having a plurality of nodes, and a plurality of access points each coupled to the communication network at a respective one of the nodes, the access points serving as respective wireless communication links between the communication network and one or more mobile communication units registered thereto, a method of communicating an information packet is provided including the steps of directing an information packet over the communication network to a particular one of the access points to which a particular one of the one or more mobile communication units is considered to be registered, using the particular access point to transmit the information packet to the particular mobile communication unit via wireless communication in the event the particular mobile communication unit is currently registered therewith, and using one of the plurality of access points to reroute the information packet to the particular mobile communication unit via the communication network in the event the particular mobile communication unit is not currently registered to the particular access point.

In accordance with yet another aspect of the invention, an access point is provided for use in a network communication system comprising a communication network having a plurality of nodes, the access point together with a plurality of similar access points each which are coupled to the communication network at a respective one of the nodes, with each of the access points serving as a respective wireless communication link between the communication network and one or more mobile communication units registered thereto, the access point comprising: wireless communication means for communicating information between the respective node and any of the one or more mobile communication units which are registered to the access point, means for receiving an information packet from the communications network, the information packet being addressed to a particular one of the one or more mobile communication units, means for transmitting the information packet to the particular mobile communication unit, via the wireless communication means, in the event the particular mobile communication unit is currently registered to the access point, and means for rerouting the information packet to the particular mobile communication unit via the communication network in the event the particular mobile communication unit is not currently registered to the access point.

In accordance with another aspect of the present invention, a network communication system comprising a communication network including a plurality of nodes, a plurality of mobile data collection units, and a plurality of access points each coupled to the communication network at a respective one of the nodes, operating to convey routed data packets between the communication network and a destination mobile data collection unit, each access point comprising a transmission system for wirelessly communicating the packets to the destination unit terminal in the event that the mobile unit is within a wireless communication area and a reroute system for communicating the packet to the destination through the communication network in the event that the mobile unit is not within a wireless communication area.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS In the drawings.

Figure 2:
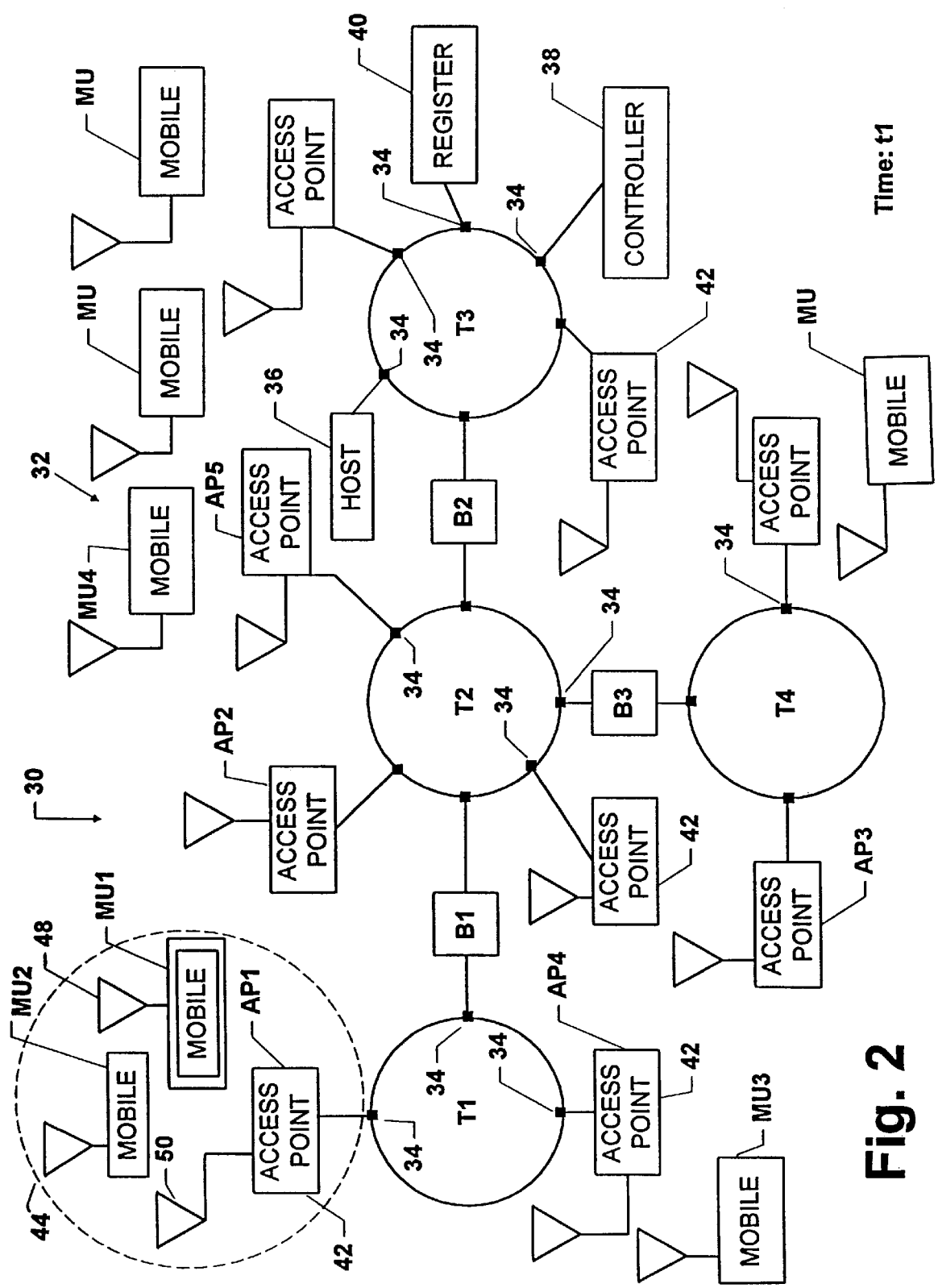
FIG. 2 is a system diagram of a token ring network communication system in accordance with the present invention, the system including access points which automatically reroute information to the mobile units in the event a mobile unit changes registration.
Figure 5:
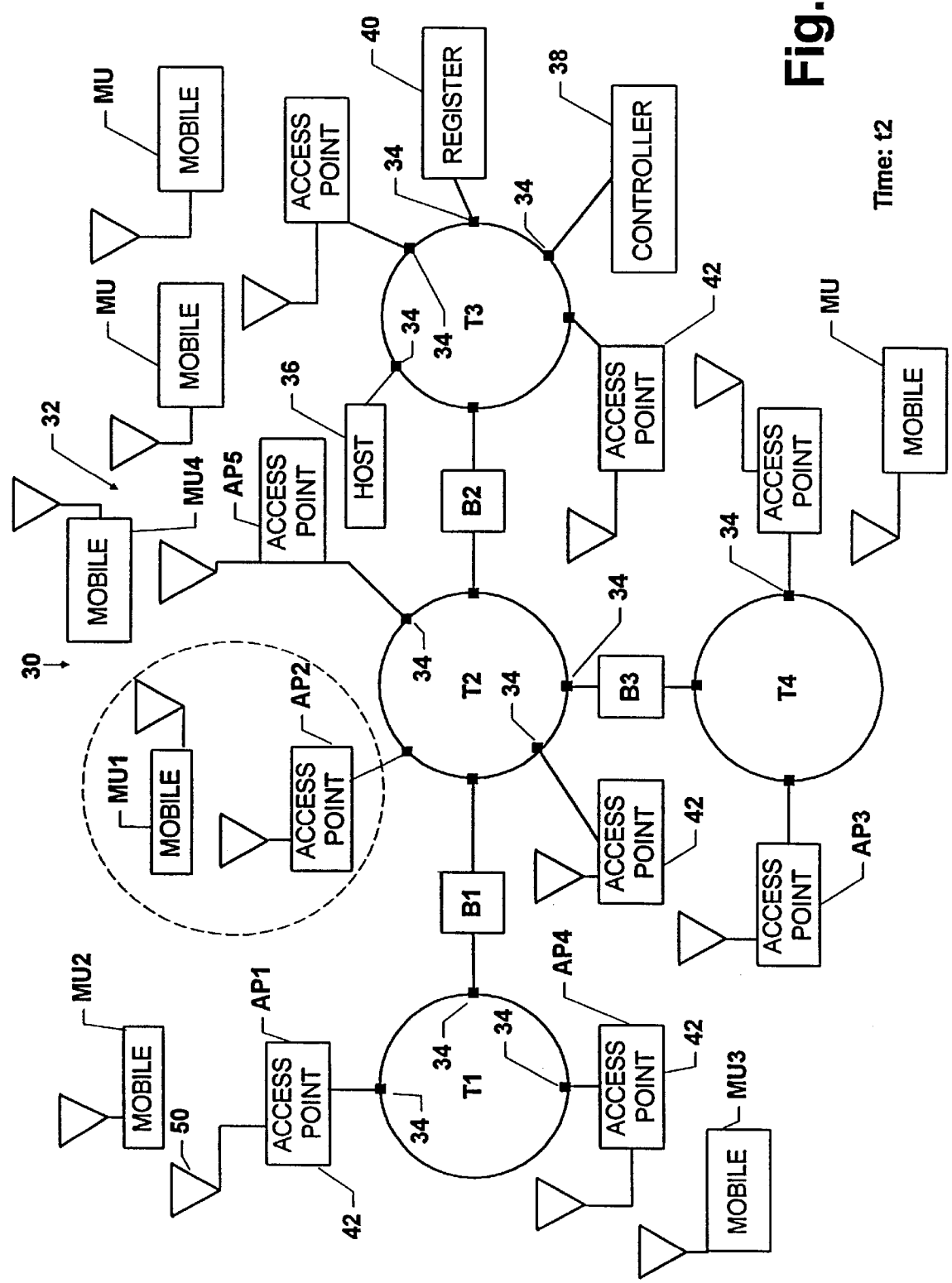
Figure 6:
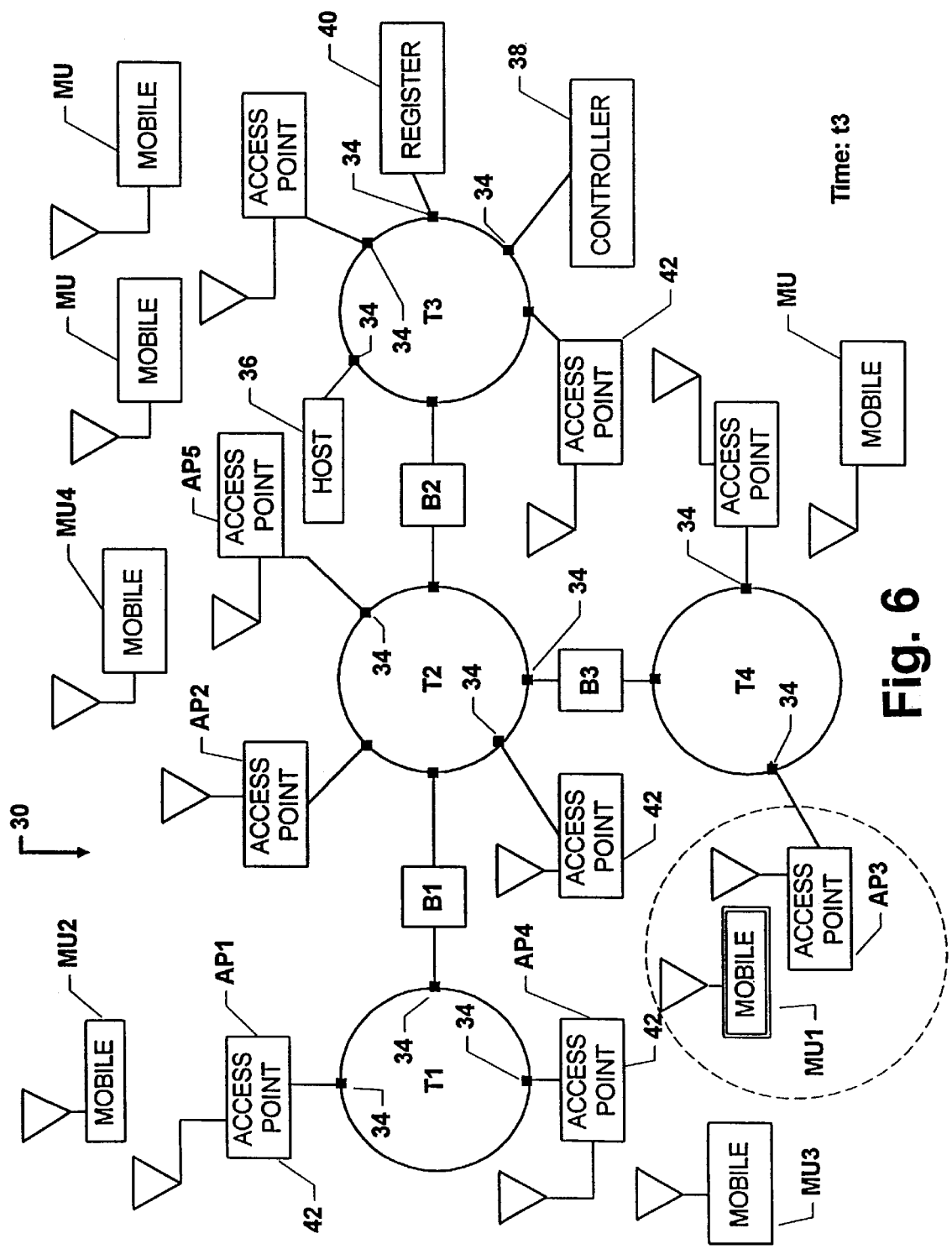
Figure 7:
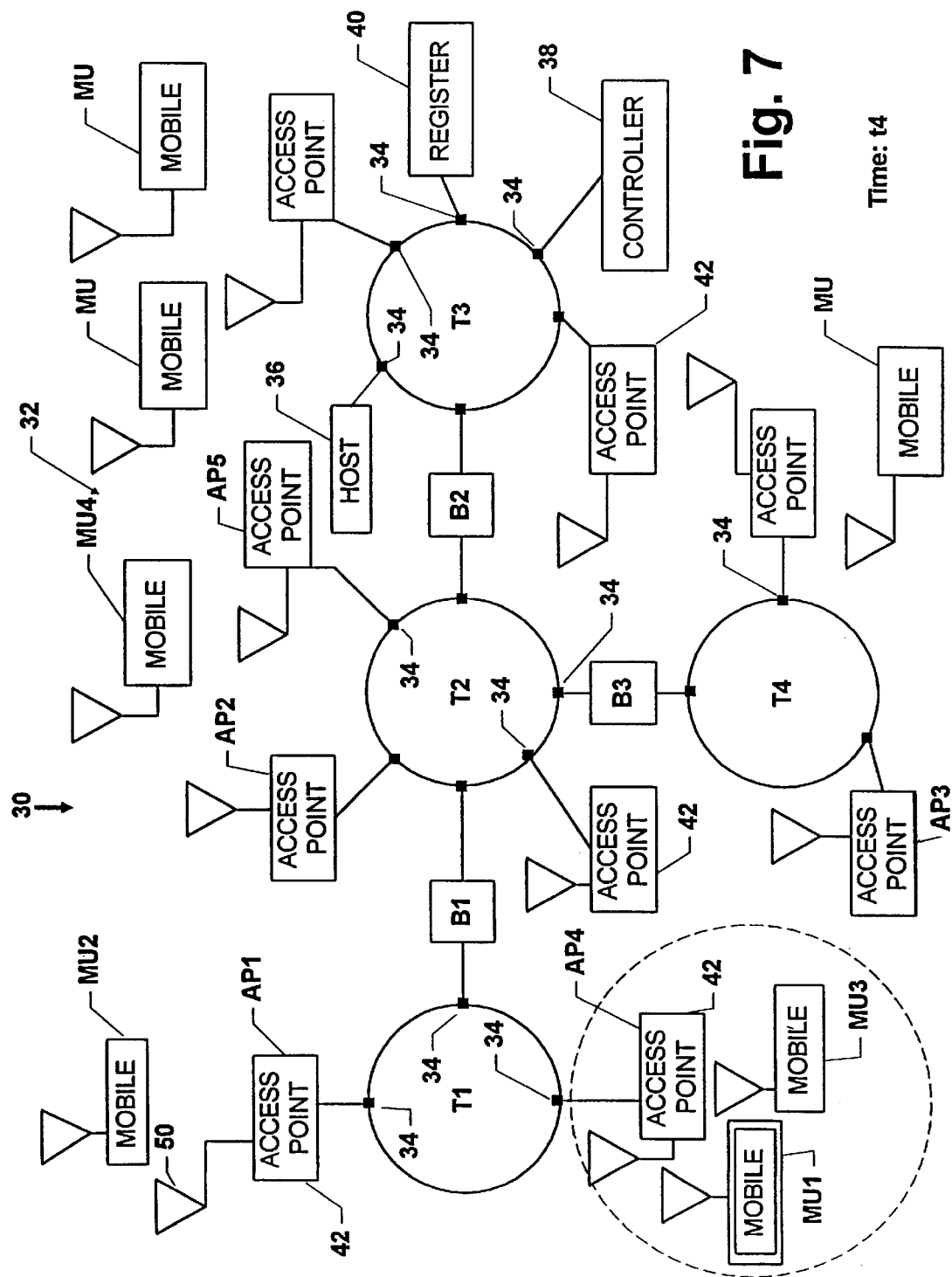
Figure 8:
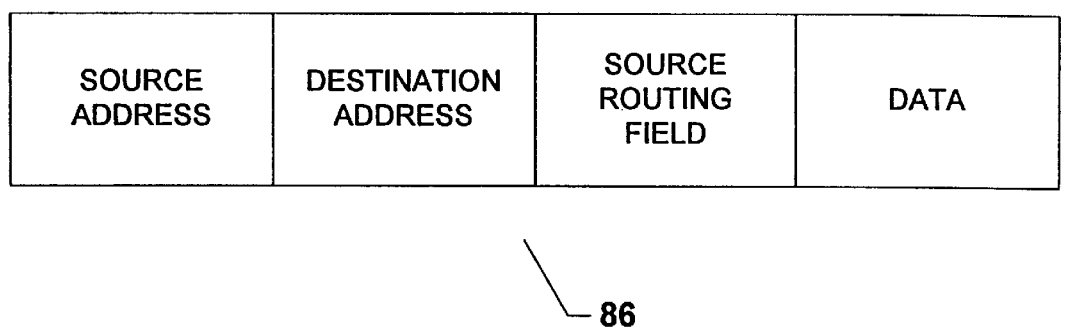
Figure 9:
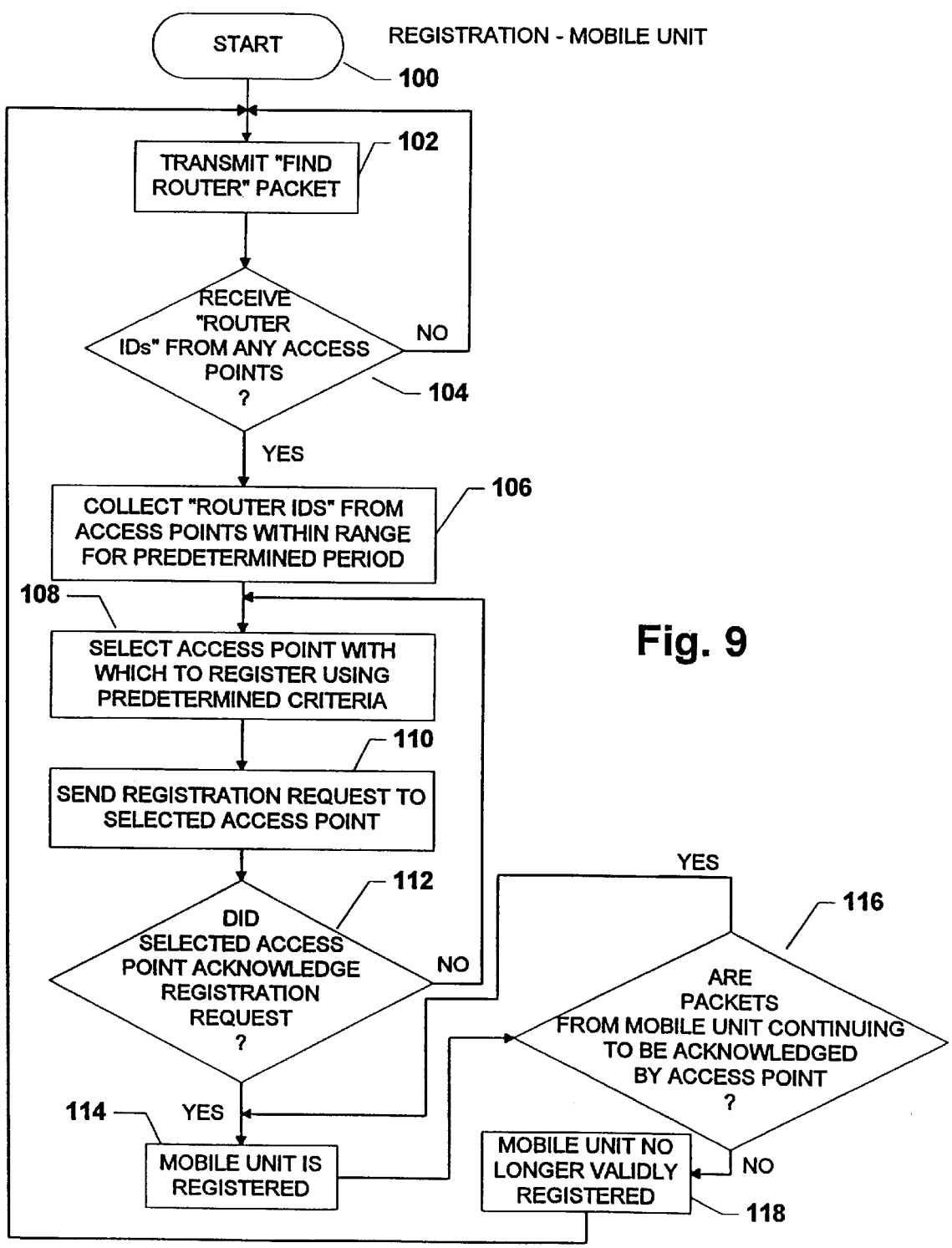
Figure 10:
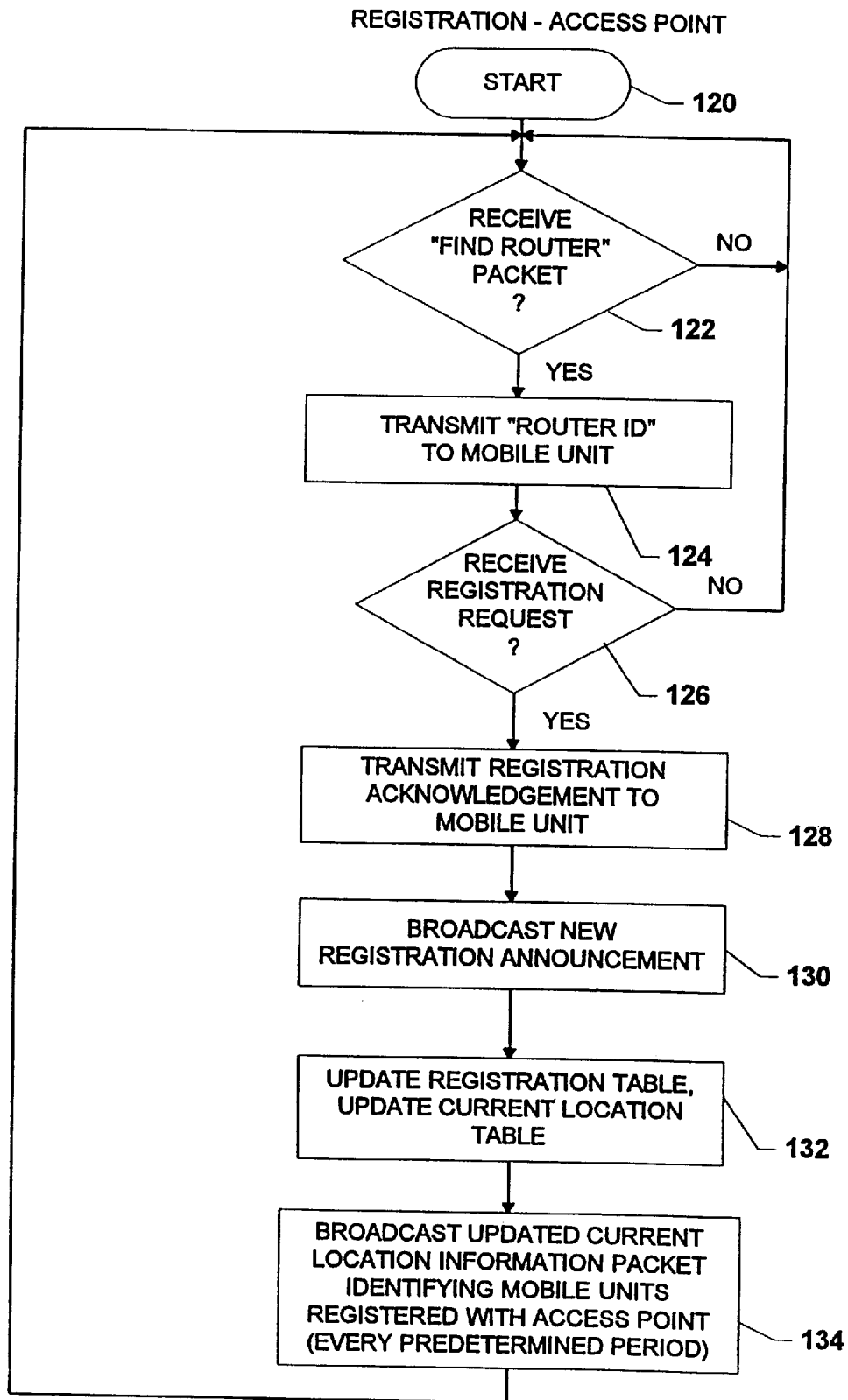
Figure 11:
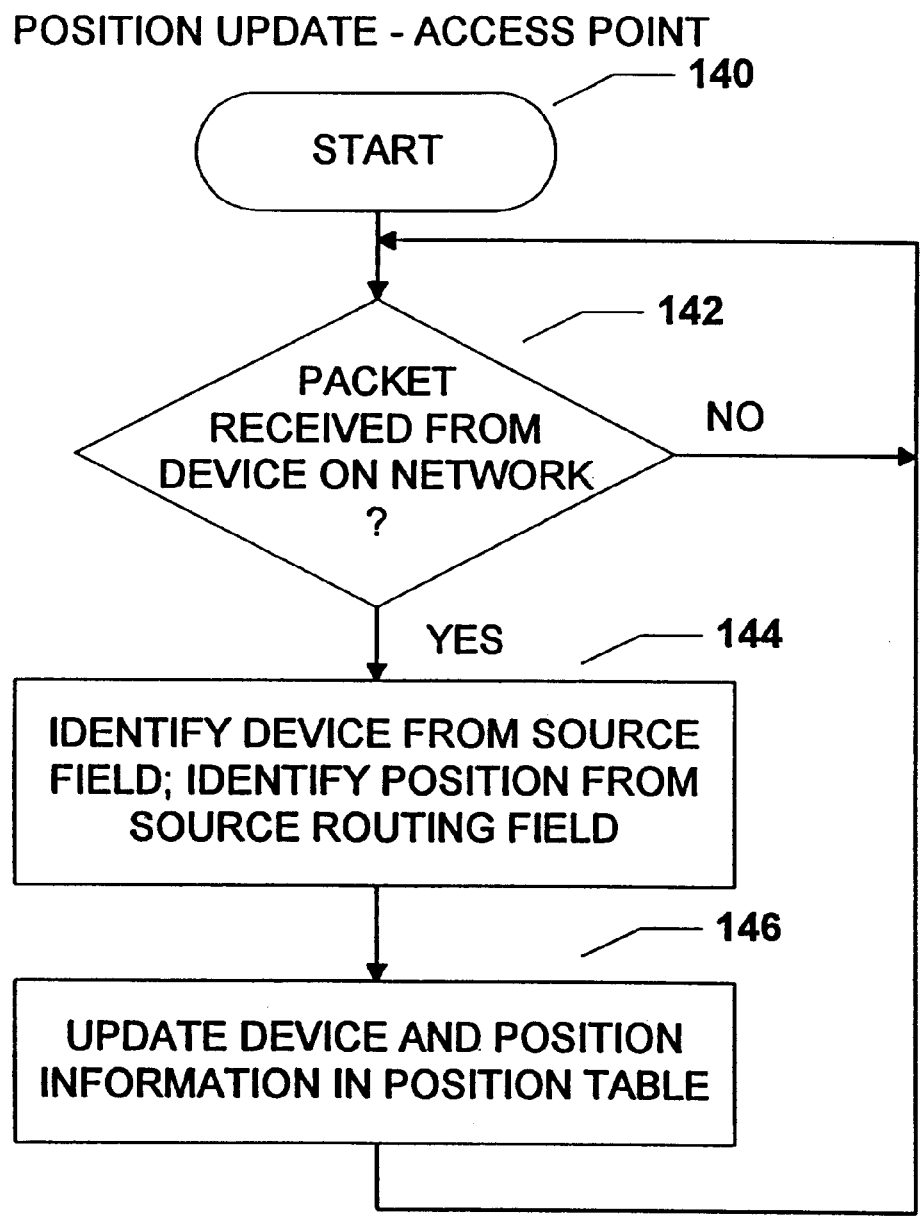
Figure 12:
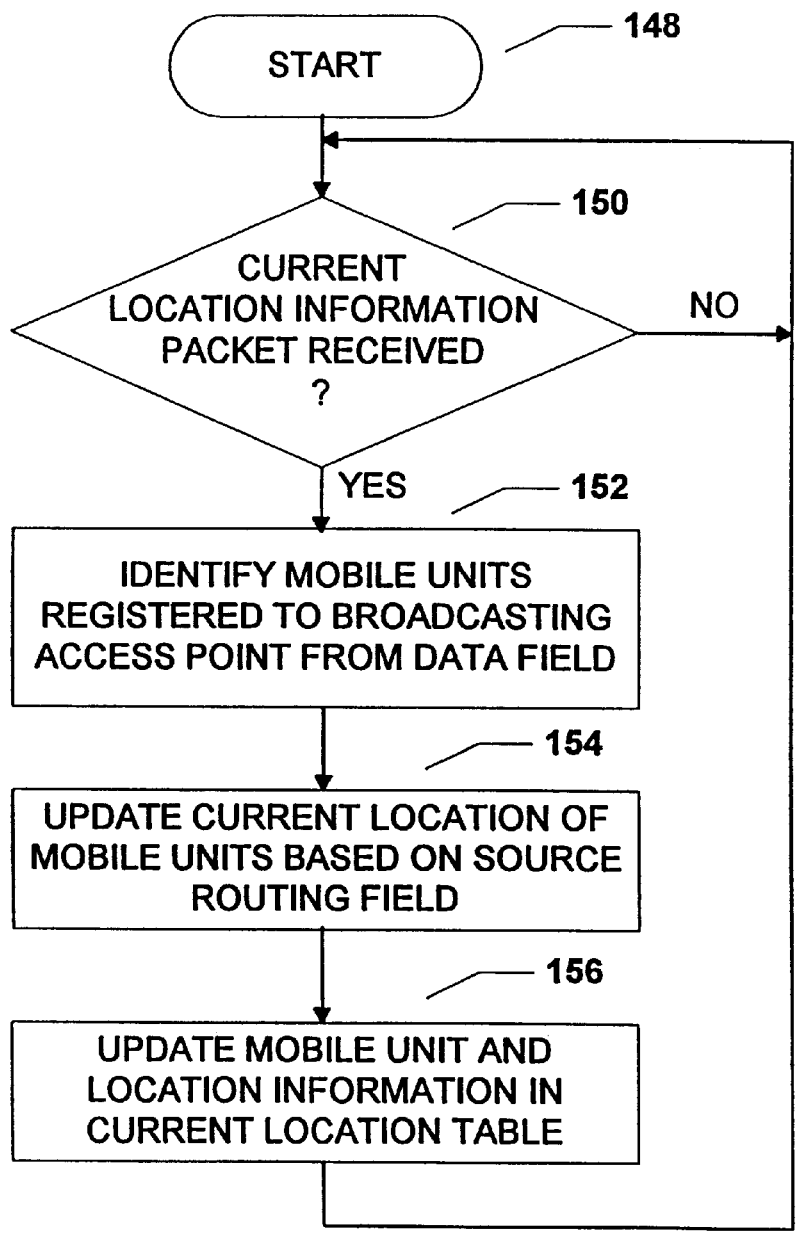
Figure 13:
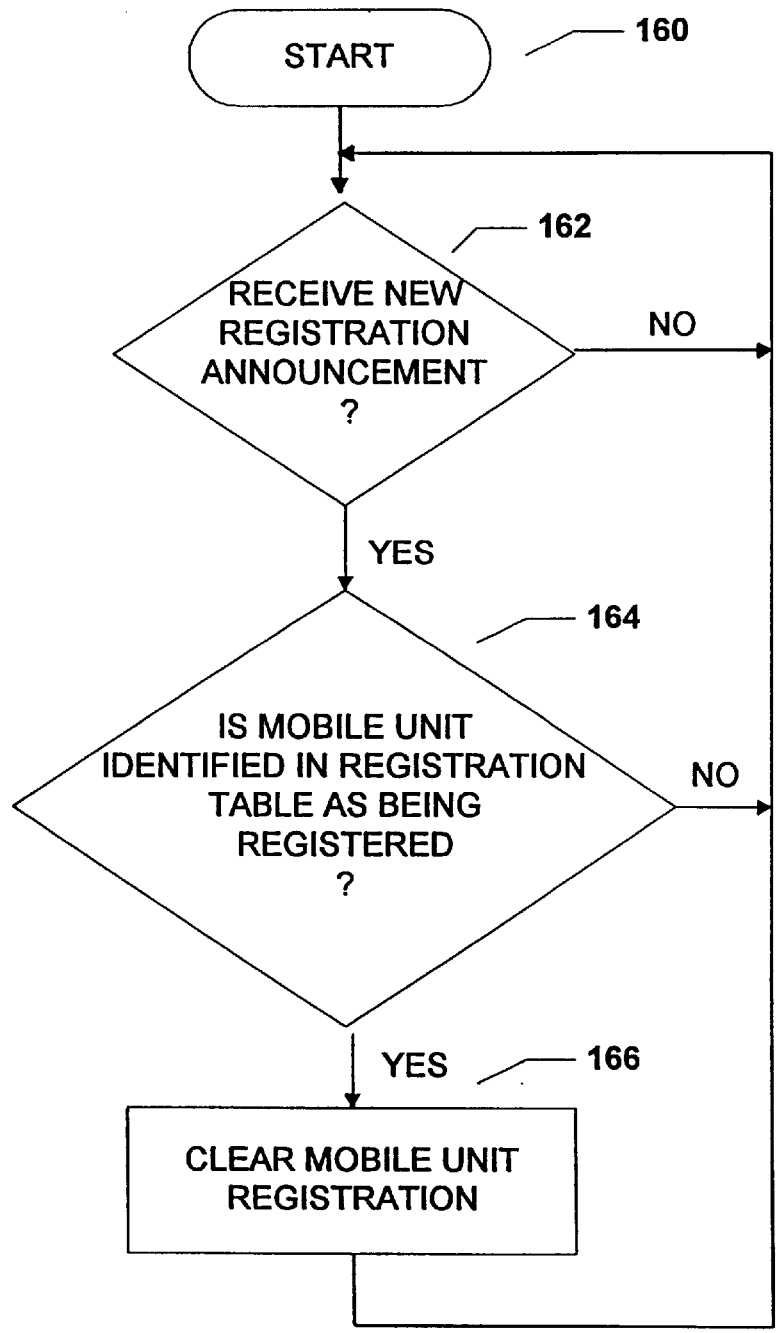
Figure 14:
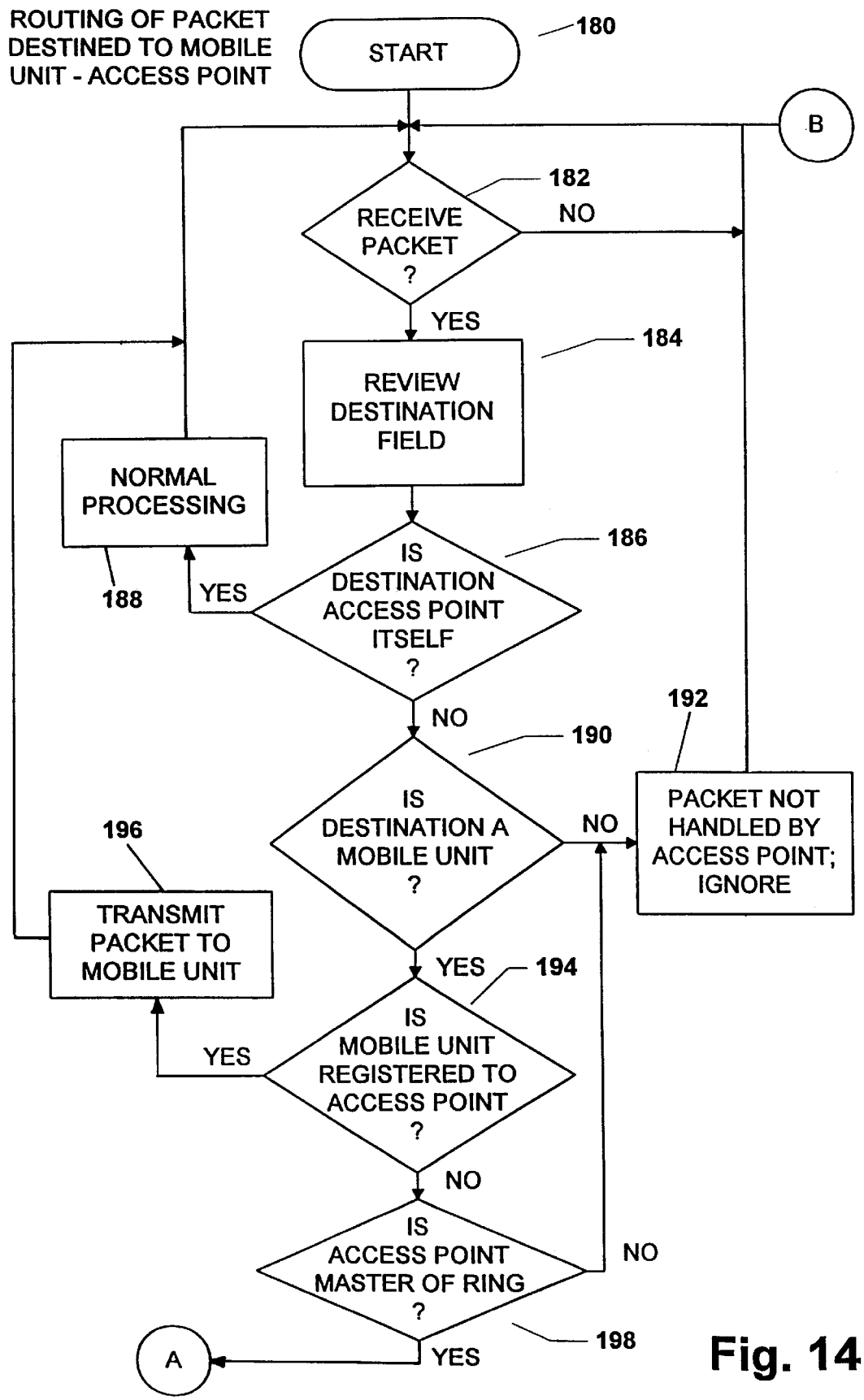
Figure 15:
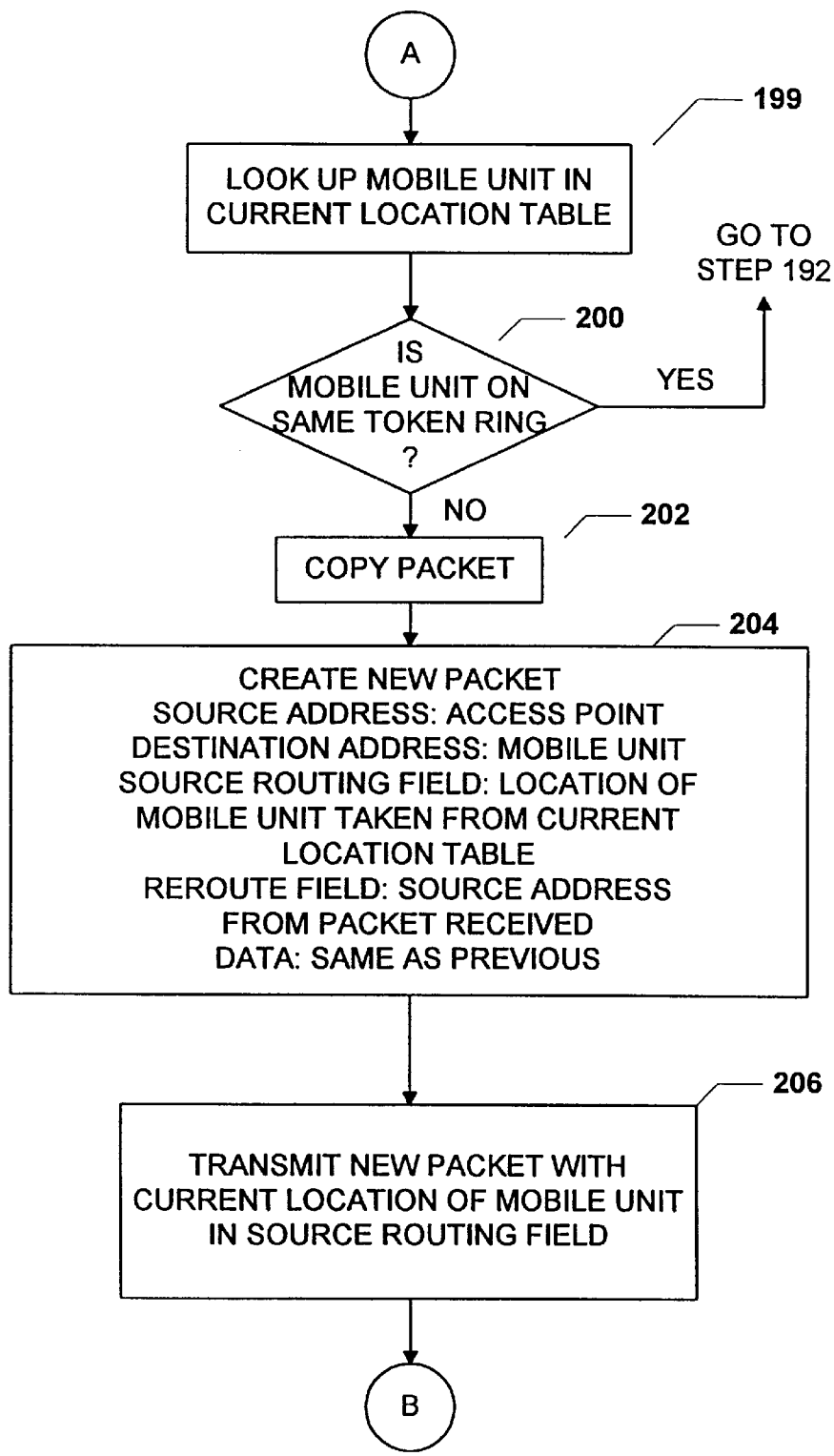
Figure 16A:
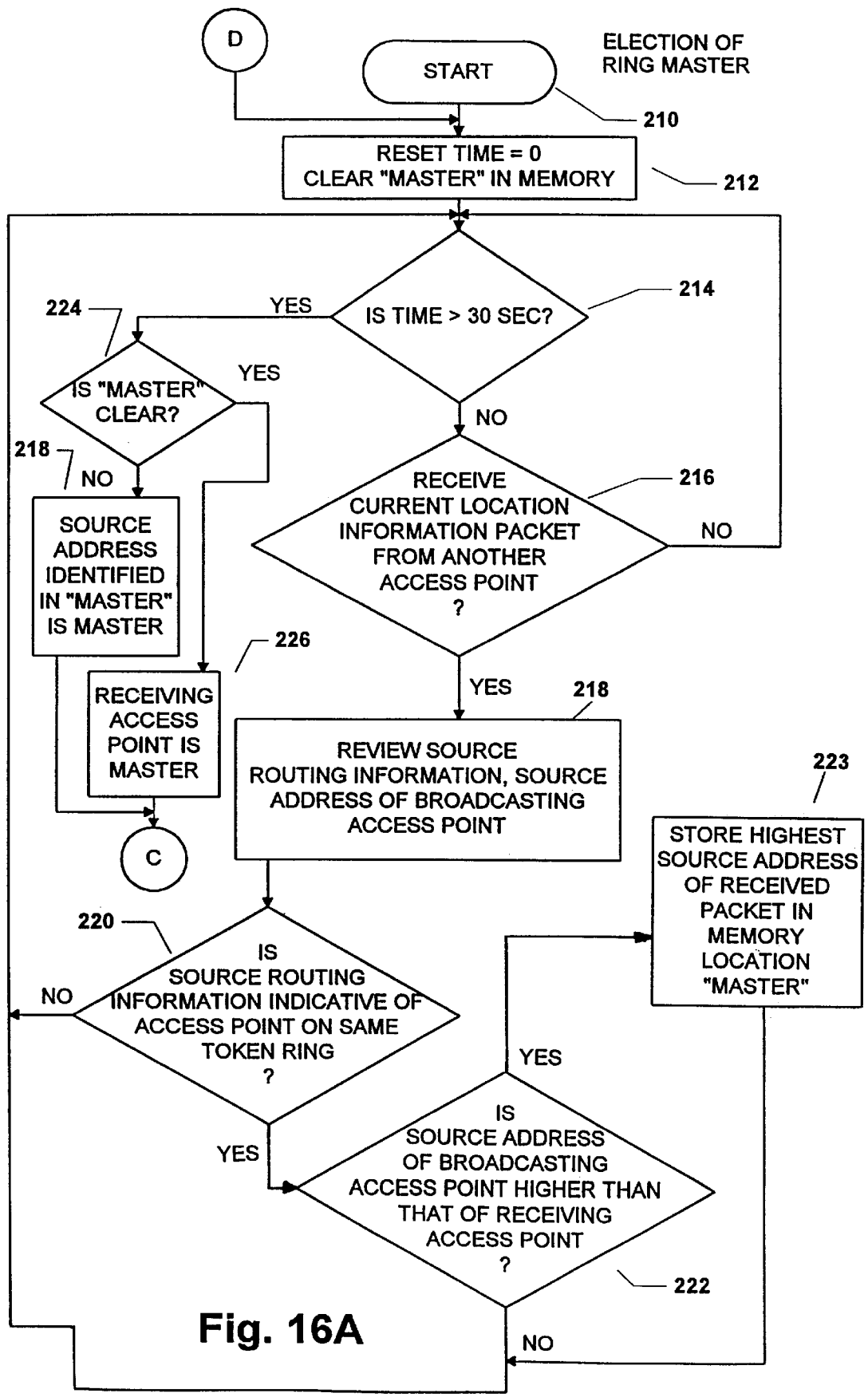
Figure 16B:
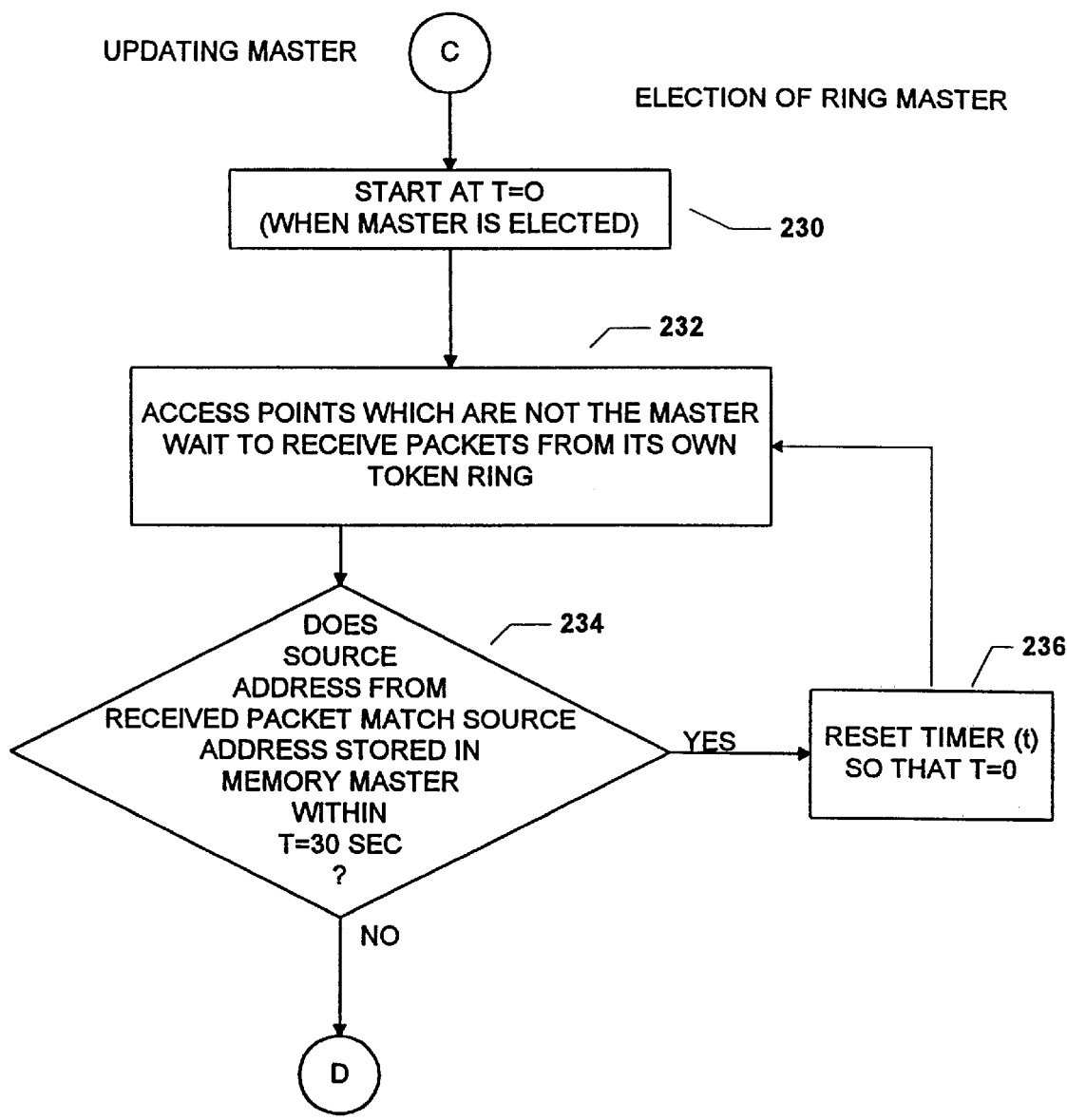
Figure 17:
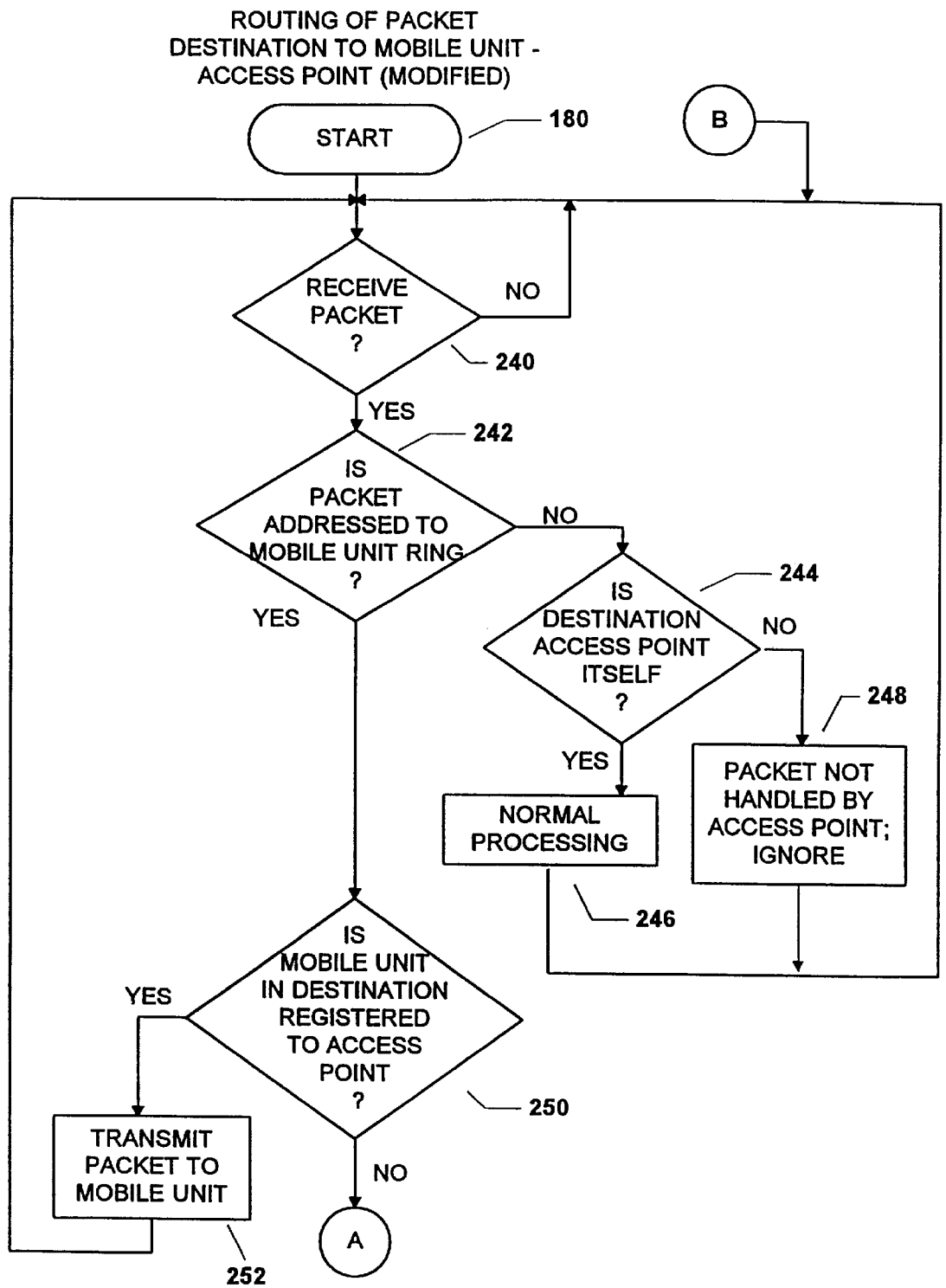

FIGS. 5, 6 and 7 each represent a system diagram of the network communication system of FIG. 2 at different respective points in time;

FIG. 8 is a schematic diagram illustrating a format of an exemplary information packet in accordance with the present invention;

FIG. 9 is a flowchart suitable for programming the operation of a mobile unit in order to register with an access point in accordance with the present invention;

FIG. 10 is a flowchart suitable for programming the operation of an access point in order to register a mobile unit in accordance with the present invention;

FIG. 11 is a flowchart suitable for programming the operation of an access point to store and update position information in its position table in accordance with the present invention;

FIG. 12 is a flowchart suitable for programming the operation of an access point in order to store and update current location information regarding the various mobile units in its current location table in accordance with the present invention;

FIG. 13 is a flowchart suitable for programming the operation of an access point in order to store and update mobile unit registration information in accordance with the present invention;

FIGS. 14 and 15 represent a flowchart suitable for programming the operation of an access point to route an information packet destined for a mobile unit to the access point with which the mobile unit is currently registered in accordance with one embodiment of the present invention;

FIGS. 16A and 16B represent a flowchart suitable for programming the operation of an access point to determine which access point on a token ring is considered the master in accordance with the present invention;

FIG. 17 is a partial flowchart suitable for programming the operation of an access point to route an information packet destined for a mobile unit to the access point with which the mobile unit is currently registered in accordance with another embodiment of the present invention

DESCRIPTION OF THE PREFERRED EMBODIMENTS

The present invention will now be described with reference to the drawings, wherein like reference numerals are used to refer to like elements throughout.

Referring initially to FIG. 2, a network communication system in accordance with the invention is generally designated 30. In the exemplary embodiment, the system 30 includes a hard wired token ring network 32 having four token rings T1–T4 interconnected by network bridges B1–B3. Specifically, bridge B1 connects token ring T1 to token ring T2, and bridge B2 connects token ring T2 to token ring T3. Similarly, token ring T2 is connected to token ring T4 by bridge B3. The token rings T1–T4 and bridges B1–B3 are constructed and configured using known token ring and bridge techniques such as those found in conventional token ring local area networks (LANs). For example, the token ring network 32 may be configured according to the IEEE 802.5 Token Ring Wired LAN Protocol. The token rings and bridges allow information packets to be transmitted from one location on a given ring within the network to any other location on another ring in the network, as will be appreciated. Although the particular configuration of the network 32 shown in FIG. 2 represents a T-shaped configuration, it will be appreciated that other configurations are well within the scope of the invention.

The network 32 includes wired LAN connections, or nodes 34, which allow network devices such as a host computer 36, a network controller 38, or a local terminal such as a cash register 40 to be connected to the network 32. The nodes 34 each include an appropriate hardwired connector (not shown) for connecting each respective network device to the respective network ring. For example, DB-9 (shielded twisted pair), and/or RJ-45 (unshielded twisted pair) type connections can be used.

Figure 1A:
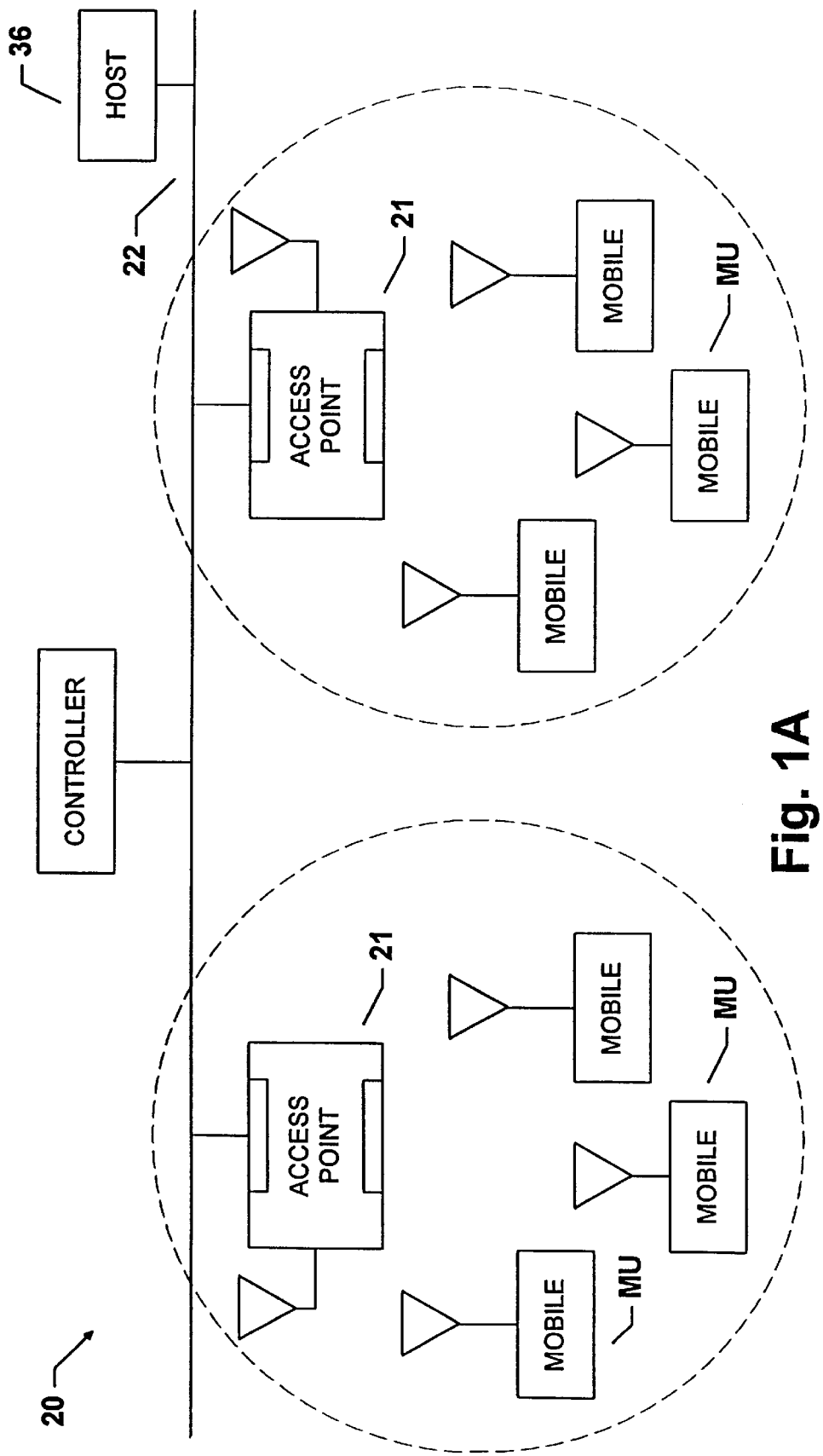
FIG. 1A is a system diagram of a conventional Ethernet network having access points for providing wireless access between mobile units and an Ethernet LAN.
Figure 1B:
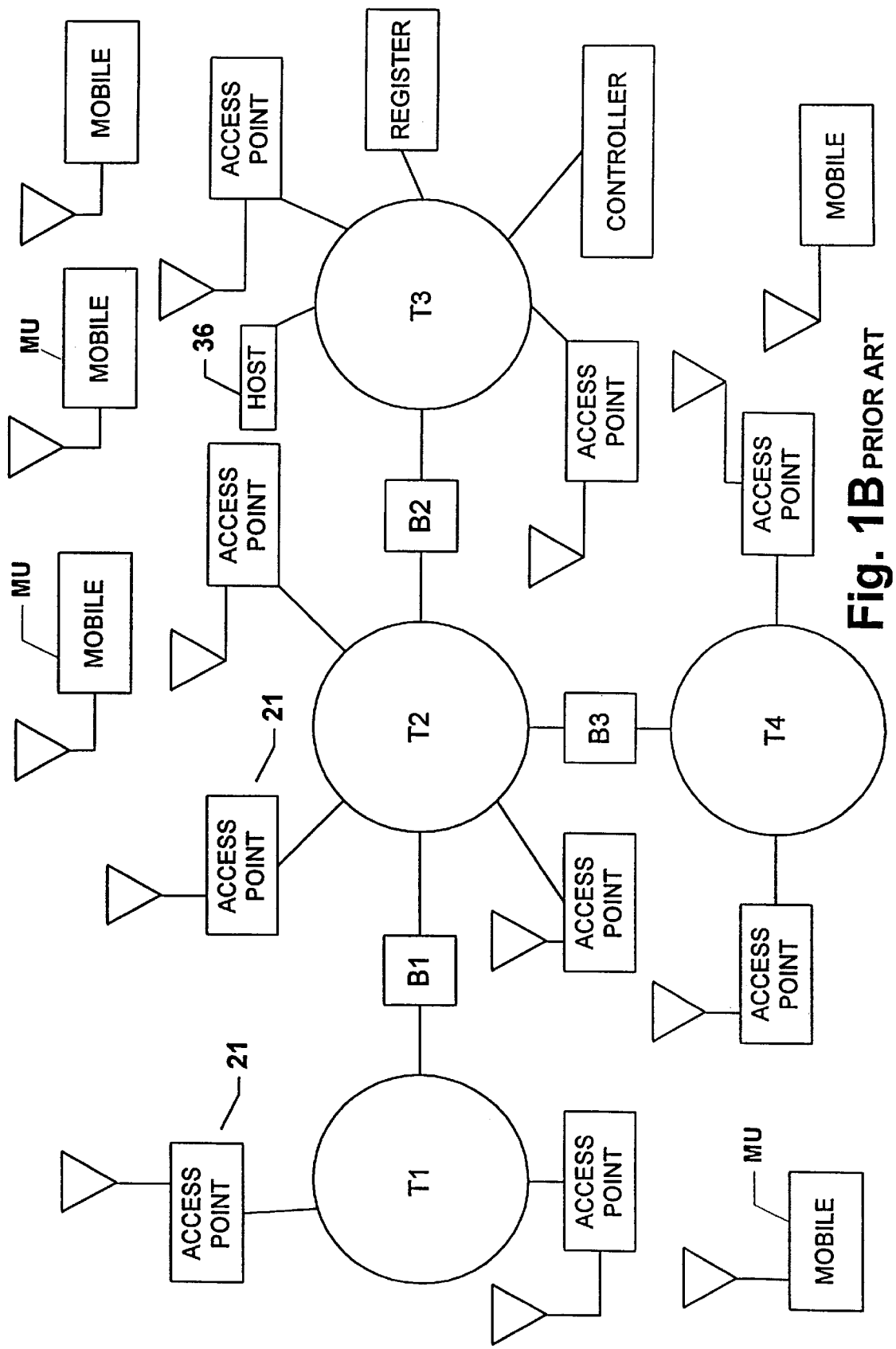
FIG. 1B is a system diagram of a conventional token ring network with access points for providing wireless access between mobile units and a token ring LAN.

Connected to various nodes 34 throughout the network 32 are respective access points AP1, AP2, AP3, ... AP5, etc. As in the systems discussed above in connection with FIGS. 1A and 1B, the access points provide wireless LAN access to the network 32 for one or more mobile units MU registered therewith. Each access point, generally designated 42, is connected at a particular node 34 to one of the token rings.

For example, access point AP1 is connected at node 34 to token ring T1 as is shown in FIG. 2. Access point AP1 has mobile units MU1 and MU2 registered to it as represented by its cell coverage area 44. Similarly, access point AP5 is connected at node 34 to token ring T2. Access point AP5, as shown in FIG. 2, has mobile unit MU4 registered to it and provides the particular mobile unit with wireless access to the network 32. The manner in which each of the mobile units MU are registered with a particular access point 42 is discussed in more detail below in connection with FIG. 9.

In the event access point AP1 wishes to communicate with access point AP5 on token ring T2, for example, access point AP1 places data in the form of an information packet (FIG. 8) onto token ring T1 where it is copied by bridge B1 and placed on token ring T2 according to conventional token ring protocol. In turn, access point AP5 is able to copy the information packet from token ring T2. Should a mobile unit such as MU1 want to send information to the host computer 36, for example, mobile unit MU1 first transmits the information to the access point 42 with which it is currently registered, i.e., access point AP1. Such transmission in the preferred embodiment is via radio frequency (RF) communication between antennas 48 and 50. Alternatively, the wireless communication between the mobile unit and the access point can be via an optical link as will be appreciated. The access point AP1 places the information received from mobile unit MU1 into an information packet with appropriate source routing information and places the packet onto token ring T1 of the network 32. The information packet is then copied by bridge B1 and is placed on token ring T2 where it is subsequently copied by bridge B2 and placed on token ring T3. Thereafter, the host computer 36 can copy the packet off of token ring T3.

As briefly described above, devices on the network 32, such as the host computer 36 and the cash register 40, include typical token ring communication circuitry for providing source routing. Such circuitry includes a position table used for storing and identifying the route for sending information packets to particular destinations on the network. Because of the ability of the mobile units to change their location and de-register with one access point and re-register with another, however, these position tables can result in information packets directed to a particular mobile unit becoming misrouted as mentioned above in the background of the invention. The access points 42 in accordance with the present invention provide for re-routing of such misrouted packets as described below. Consequently, the system 30 avoids losing information on the network due to misrouted information packets. This is true even in the event the network 32 includes devices which are not able to update or maintain the route to a particular mobile unit in its position table. The manner in which the access points 42 reroute misrouted information packets in accordance with the present invention is described in more detail below with reference to FIGS. 9–17.

Figure 3:
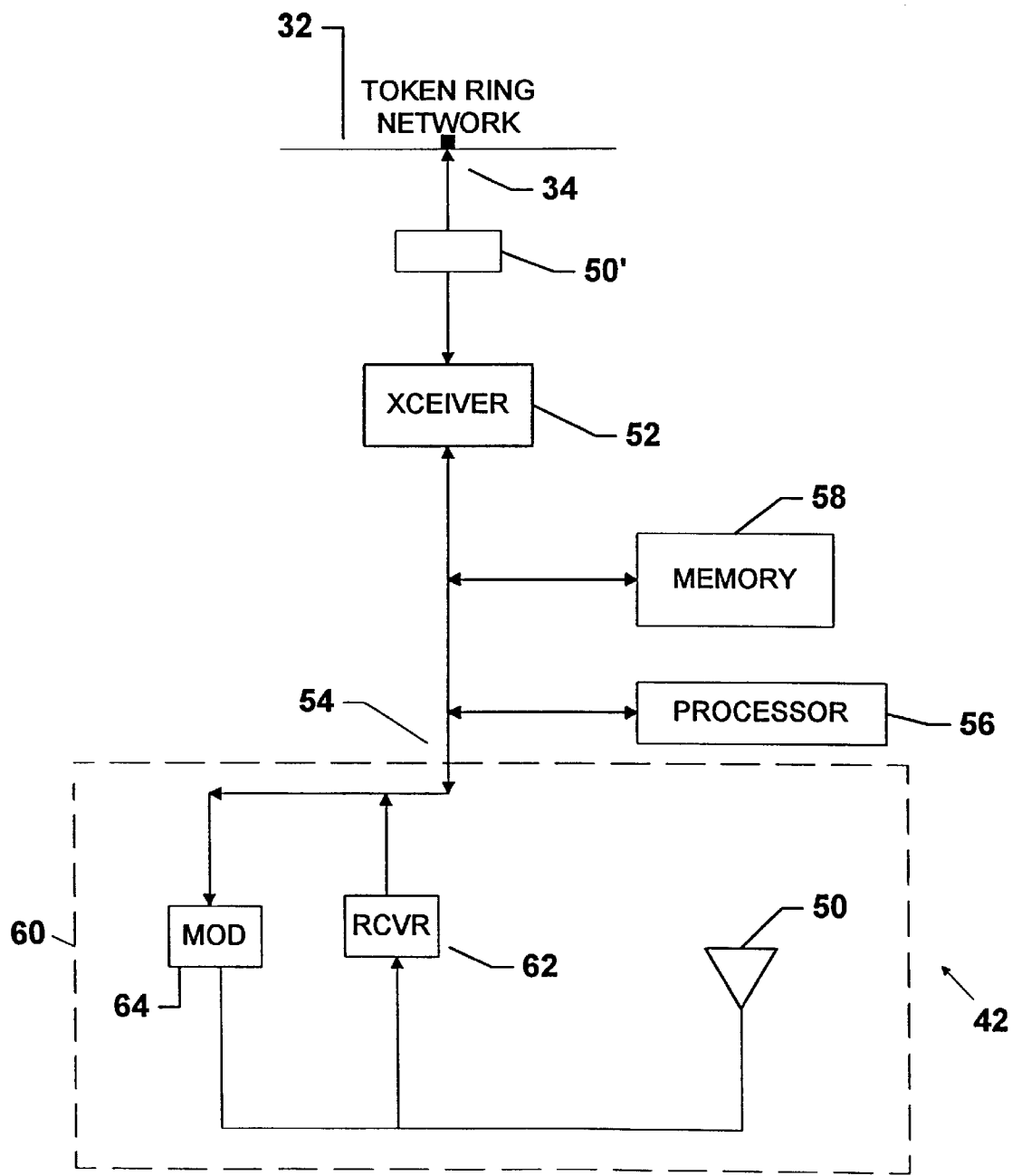
FIG. 3 is a block diagram of an access point in accordance with the present invention.

Referring now to FIG. 3, a block diagram of an access point 42 is shown in accordance with the present invention. The access point 42 is connected to a given token ring T1–T4 via a connector 50' such as a DB-9 or RJ-45 connector. The connector 50' is connected to the token ring network 32 at one end and to a network adapter transceiver 52 included in the access point 42 at the other end. The network adapter transceiver 52 is configured according to conventional network adapter transceiver techniques to allow the access point 42 to communicate over the network 32. The network adapter transceiver 52 is also connected to an internal bus 54 included within the access point 42. The access point 42 further includes a central processor 56 connected to the bus 54 for controlling and carrying out the operations of the access point. The central processor 56 may include any of a variety of different microprocessors, such as the Motorola 68360 (25 MHz) or Intel 80386 microprocessors.

The access point 42 also includes a memory 58 connected to the bus 54. The memory 58 stores program code executed by the central processor 56 to control the other elements within the access point 42 to carry out the functions described herein. It will be readily apparent to a person having ordinary skill in the art of computer programming how to program the central processor 56 and the other elements within the access point 42 to carry out the operations described herein using conventional programming techniques based on the flowcharts and descriptions provided herein. As a result, additional detail as to the specific program code has been omitted. The memory 58 also serves to buffer packets of information such as those received over the network 35 or those transmitted to or received from the mobile units. Moreover, the memory 58 functions to store information tables (e.g., "position", "current location" and "registered mobile units" tables) maintained by the processor 56 as is described more fully below in connection with FIGS. 9–7.

Also connected to the bus 54 is an RF section 60 included in the access point 42. The RF section 60 includes an antenna 50 for receiving radio signals from and transmitting radio signals to mobile units within its cell area. Information transmitted from a mobile unit MU is received via the antenna 50 and is processed by an RF receiver 62 which demodulates the signal and converts the information to a digital signal. The information from the mobile unit typically is in the form of a packet including data together with a source identifier (i.e., the particular mobile unit sending the information) and a destination (e.g., the host computer 36 or other location to which the mobile unit wishes to transmit the data). The processor 56 in the access point 42 inserts source routing information into the source routing field of the packet received from the mobile unit, if needed. Thereafter, the processor 56 stores the packet in the memory 58 until such time as the access point 42 is able to transmit the information packet onto the network 32 via the network adapter transceiver 52 and connector 50'.

Information packets which are transmitted to the access point 42 for transmission to a mobile unit MU are received via the network 32 by the network transceiver 52. The processor 56 controls an RF modulator 64 included in the RF section 60, the RF modulator 64 also being connected to the bus 54. The processor 56 causes the RF modulator 64 to modulate an RF signal using spread spectrum techniques, for example, which in turn carries the information to the desired mobile unit MU. Exemplary hardware and software for carrying out several of the above-described basic functions of transmitting and receiving data between the network 32 and one or more mobile units is found in the ARLAN 631® Token Ring Access Point, which is commercially available from Aironet Wireless Communications, Inc., Akron, Ohio, the assignee of the present invention.

Figure 4:
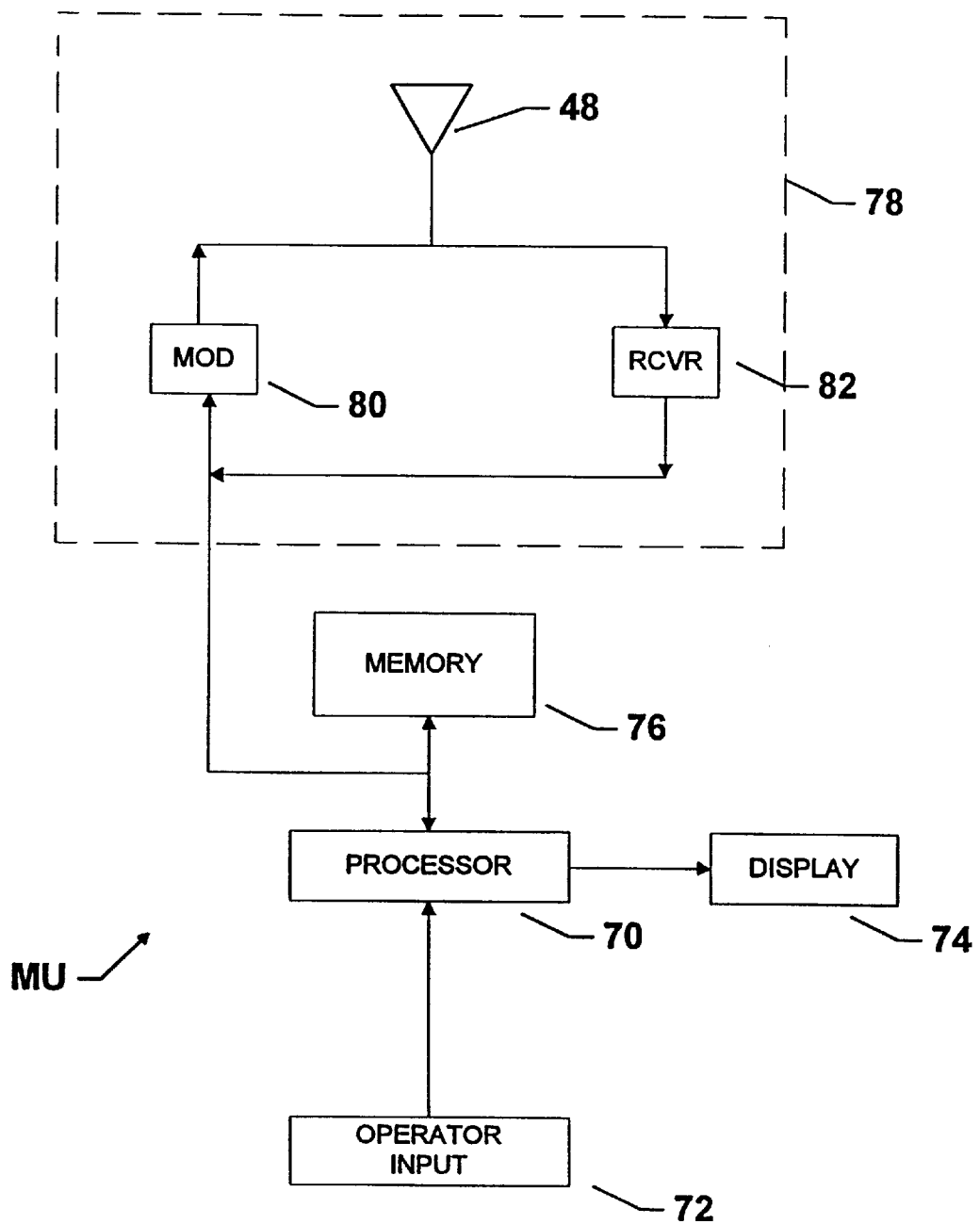
FIG. 4 is a block diagram of a mobile unit in accordance with the present invention.

Referring now to FIG. 4, shown is a block diagram of a mobile unit MU for use in connection with the system 30 of the present invention. Each mobile unit MU includes a processor 70 which can be programmed to control and to operate the various components within the mobile unit MU in order to carry out the various functions described herein. The processor 70 is coupled to an operator input device 72 which allows an operator to input data to be communicated to the network 32 such as inventory data, patient information, etc. This information may be sent to the host computer 36 which serves as a central data location, for example, or to the cash register 40 for providing price information. The input device 72 can include such items as a keypad, touch sensitive display, bar code scanner, etc. A display 74 is also connected to and controlled by the processor 70. The display 74 serves as a means for displaying information stored within the mobile unit MU and/or received over the network 32 via the access point 42. The display 74 can be a flat panel liquid crystal display with alphanumeric capabilities, for example, or any other type of display as will be appreciated.

A memory 76 is included in each mobile unit MU for storing program code run by the processor 70 for carrying out the functions described herein. The actual code for performing such functions could be easily programmed by a person having ordinary skill in the art of computer programming in any of a number of conventional programming languages based on the disclosure herein. Consequently, further detail as to the particular code has been omitted for brevity. The memory 76 also serves as a storage medium for storing information packets received from or intended to be transmitted to an access point 42 as discussed herein.

The mobile unit MU also includes its own RF section 78 connected to the processor 70. The RF section 78 includes a modulator 80 which is controlled by the processor 70 and modulates an RF signal using spread spectrum techniques, for example, in order to transmit information packets to an access point 42 via an antenna 48. The RF section 78 also includes a RF receiver 82 which receives RF transmissions from an access point 42 via the antenna 48 and demodulates the signal to obtain the digital information modulated thereon. It will also be appreciated that the RF receiver 82, together with the RF receiver 62 in each access point 42, may include various demodulators and filters (not shown) which operate in a conventional manner to extract a modulated bit stream from the received signal. An example of a suitable RF receiver for use in both the access points 42 and the mobile units MU is the Model 024 Direct Sequence Spread Spectrum Radio Module, which is commercially available from the aforementioned Aironet Wireless Communications, Inc.

In the event the mobile unit MU is to transmit information to the network 32 in response to an operator input at input 72, for example, the processor 70 forms within the memory 76 an information packet including data together with a source identifier (i.e., the particular mobile unit sending the information) and a destination (e.g., the host computer 36). The information packet is then delivered to the RF modulator 80 which modulates an RF signal, again using spread spectrum techniques, for example, and transmits the RF signal to an access point 42 with which the mobile unit MU is registered via the antenna 48. Conversely, information packets from the network 32 which are transmitted to the mobile unit MU from an access point 42 are received by way of the antenna 48. The RF receiver 82 demodulates the received signal in order to extract the digital information which is then stored by the processor 70 in memory 76. Thereafter, the information can be further processed by the processor 70 as needed.

An exemplary mobile unit MU which is configured to operate in accordance with the description herein is the commercially available Model PTC-960 portable computer with Model 024 Direct Sequence Spread Spectrum Radio Module. Such unit is available from Aironet Wireless Communications, Inc. mentioned above.

Again referring to FIG. 2, the operation of the system 30 in accordance with the present invention will initially be described by way of example. As mentioned above in connection with FIG. 3, the memory 58 in each access point 42 includes a "position" table, a "current location" table, and a "registered mobile units" table. Such information is shown by example for access points AP1 and AP2 in the following tables. It will be appreciated, however, that each of the access points 42 in the system 30 stores similar information in the same manner. The "position", "current location", and "registered mobile units" information shown in the following tables is represented at time t1 when the mobile units MU are in the locations shown in FIG. 2.

| AP1: Time t1 | |
|---|---|
| Position | |
| Device | Position |
| AP2 | T1, B1, T2 |
| AP3 | T1, B1, T2, B3, T4 |
| AP4 | T1 |
| . | . |
| . | . |
| . | . |
| HOST | T1, B1, T2, B2, T3 |
| REGISTER | T1, B1, T2, B2, T3 |
| Current Location | |
| Device | Location |
| MU1 | Registered |
| MU2 | Registered |
| MU3 | T1 |
| MU4 | T1, B1, T2 |
| . | . |
| . | . |
| . | . |
| Registered Mobile Units | |
| MU1 | |
| MU2 | |

| AP2: Time t1 | |
|---|---|
| Position | |
| Device | Position |
| AP1 | T2, B1, T1 |
| AP3 | T2, B3, T4 |
| AP4 | T2, B1, T1 |
| . | . |
| . | . |
| . | . |
| HOST | T2, B2, T3 |
| REGISTER | T2, B2, T3 |
| Current Location | |
| Device | Location |
| MU1 | T2, B1, T1 |
| MU2 | T2, B1, T1 |
| MU3 | T2, B1, T1 |
| MU4 | T2 |
| . | . |
| . | . |
| . | . |
| Registered Mobile Units | |

Each access point AP1 and AP2 includes a "position" table in order to store information related to the position of each of the other devices connected to the network 32. The information in the "position" table is constantly updated in the manner described below in connection with FIG. 11. This "position" table is used by the respective access points 42 when inserting source routing information into packets being sent by a mobile terminal to a destination on the network. In particular, the "position" table allows the particular access point 42 to insert the correct sequence of token ring and bridge numbers such that a transmitted packet is routed to the appropriate token ring on which the device being communicated with is located.

Hence, by way of example, the "position" table for access point AP1 at time t1 indicates that the route from access point AP1 to access point AP2 is from token ring T1, to bridge B1, and finally to token ring T2. For ease of understanding, it will be appreciated that the information shown in the respective tables is represented in alphanumeric shortform (e.g., T1, B1) and in order of source to destination. As another example, the route from the access point AP1 to the host computer 36 at time t1 is from token ring T1, to bridge B1, to token ring T2, to token ring B2, and finally to token ring T3. Similar information as to the position of the other devices is reflected in the remainder of the "position" table. In actual implementation, the routing information will be stored digitally in memory 58 using conventional token ring format.

The "current location" table for each access point 42 is used to keep an updated list of the location of the various mobile units MU within the system 30. The "current location" table includes the current locations of the mobile terminals MU such that the access point 42 can redirect misrouted information packets to the access point 42 with which a mobile terminal is currently registered. This aspect of the invention is described below in more detail specifically in relation to FIGS. 14 and 15. Each access point 42 receives a respective information packet which is broadcast periodically from each of the other access points on the network 32. These information packets identify which particular mobile units MU are currently registered with the respective access points. The processor 56 utilizes this information in the manner described below in connection with FIG. 12 in order to update the information in its "current location" table.

At time t1 as shown in FIG. 2, mobile units MU1 and MU2 are registered to access point AP1 which is on token ring T1. Mobile unit MU3 is registered to access point AP4 on token ring T1, and mobile unit MU4 is registered to access point AP5 on token ring T2. The preferred manner in which the mobile units MU actually register and de-register with a particular access point 42 is described in detail below in connection with FIG. 9. In the "current location" table of access point AP1, mobile units MU1 and MU2 are identified as being registered with access point AP1. This is accomplished by the setting of an appropriate flag or the like, The processor 56 in access point AP1, upon determining that the mobile units MU1 and MU2 are registered with access point AP1 as described below with respect to FIG. 11, is programmed to set the appropriate flag in the "current location" table. As for the other mobile units in the "current location" table, mobile unit MU3 is identified as being located on token ring T1 which coincides with the location of AP4 to which the mobile unit is registered. It is noted that as in the "position" table, the location information is represented in the "current location" table in alphanumeric shortform (e.g., T1, B1) and in order of source to destination. In this case, the location information represents the route from the access point 42 to the respective access point to which the mobile unit is registered. Consequently, the "current location" table in access point AP2 at time t1 identifies mobile unit MU3 as being located according to a route described by T2, B1, T1. Similarly, each of the "current location" tables in each of the other access points 42 include their own current location information with respect to the mobile units MU within the system 30.

Finally, the memory 58 in each access point 42 includes the aforementioned "registered mobile units" table which is used for storing the identities of those mobile units MU which are currently registered to the access point. Thus, for example, the "registered mobile units" table for access point AP1 at time t1 includes mobile units MU1 and MU2. Similarly, the "registered mobile units" table for access point AP2 at time t1 is empty since no mobile units MU are currently registered to the access point. The manner in which the contents of the "registered mobile units" table is maintained as described in detail below in connection with FIG. 9.

Supposing now that at time t1 the mobile unit MU1 wishes to communicate with the host computer 36. The mobile unit MU1 transmits an information packet addressed to the host computer 36 to the access point AP1 to which it is currently registered. The processor 56 in access point AP1 identifies the destination of the packet as being the host computer 36. Thereafter, the processor 56 reads the information from the "position" table stored in memory 58 to determine the source routing information to transmit the information packet from the access point to the host computer 36. In this instance, the processor 56 looks up the host computer in the "position" table and source routing information is obtained to transmit the information packet from token ring T1, to bridge B1, to token ring T2, to bridge B2, to token ring T3. According to conventional token ring protocol, when the information packet is transmitted onto token ring T3 by bridge B2 it will be received by each device so that each device can look at the destination address in the packet and determine whether to copy the packet. It will also be appreciated that the mobile units MU are not normally able to insert their own source routing information since they are constantly changing positions and are not generally pre-programmed to know the routes needed to reach each destination. However, it will be further appreciated that the present invention still has utility even in the case where the mobile units are able to insert their own source routing information.

Referring briefly to FIG. 8, the basic format is shown for an information packet as referred to herein. The information packet is generally designated 86 and includes a source address field which includes the address of the device originally transmitting the packet. In addition, the packet 86 includes a destination address field which includes the address of the device which is intended to ultimately receive the information packet. The source routing field included in the packet 86 stores the aforementioned source routing information identifying the path along the network 32 which the packet is to take to reach its destination from the source address. Finally, the information packet 86 includes a data field in which data is located. Such data can include operational data, control data, etc., as will be appreciated. Also, an additional field, referred to herein as a "reroute" field, is added to an information packet 86 in the event the information packet 86 is rerouted from one access point 42 to another in accordance with the present invention. As is described below in connection with FIG. 15, a reroute field (not shown in FIG. 8) is added to a rerouted information packet to notify a receiving access point 42 that the information packet 86 has been rerouted.

Referring again to the aforementioned example, given the token ring configuration, the access point AP1 must wait for permission to send the information received from the mobile unit MU1 onto the network 32. As is conventional, permission is given in the form of a "token". After the access point AP1 receives permission, it transmits the packet to the host computer 36. Note, however, that each bridge (e.g., B1, B2 and B3) connecting the respective token rings must likewise wait for permission to transmit prior to sending information onto an adjacent token ring as is conventional.

After receiving the information sent from the mobile unit MU1 via the access point AP1, the host computer 36 will do whatever processing of the information is appropriate in the particular application. Oftentimes, however, the host computer 36 will need to respond back to the mobile unit MU1 at some later time. Again, source routing information will be needed by the host computer 36 when sending an information packet back to the mobile unit MU1. In one embodiment, the host computer 36 may be configured to respond to the mobile unit MU1 by way of the token ring from which the packet from the mobile unit originated (i.e., T1). In such case, the host computer 36 is programmed to look-at its own "position" table to obtain source routing information to the originating token ring. This routing information is then placed in the source routing field of the information packet being sent by the host computer 36, with the destination address identifying the mobile unit MU1. In another embodiment, the host computer 36 simply reverses the order of the source routing information received in the information packet from the mobile unit MU1. This reversed source routing information therefore results in the information packet from the host computer 36 being directed to the token ring from which the packet from the mobile unit MU1 originated (i.e., T1).

In either embodiment, the host computer 36 will send its information packet back to the same location from which the transmission from the mobile unit MU1 originated on the network, namely token ring T1. As with the other access points, when receiving the packet on token ring T1, the processor 56 in the access point AP1 determines that the packet is directed to mobile unit MU based on the information in the destination field. The processor 56 then reads the information stored in its "registered mobile units" table to determine whether the packet is destined for a mobile unit which is registered to the access point AP1. Assuming that the mobile unit MU1 has not changed location and is still registered with the access point AP1, the processor 56 causes the access point AP1 to copy the information packet into the memory 58. The processor 56 then utilizes the RF section 60 to transmit the information packet to the mobile unit MU1.

However, there will likely arise a situation where the mobile unit MU1 will have moved to a new cell area outside of the range of the original access point AP1 and is no longer registered therewith. For example, FIG. 5 illustrates the system 30 at time t2 which follows time t1. At time t2, the mobile unit MU1 has changed location and is now registered with access point AP2 on token ring T2. The locations of each of the other mobile units within the system 30 have stayed the same for sake of simplicity of description. The information packet transmitted from the host computer 36 to the mobile unit MU1 via the access point AP1 at time t2 would now be misrouted as it would be directed to token ring T1. The system 30 accounts for such changes in the registrations of the mobile units by updating the contents of the various tables stored in the memory 58 of each access point 42. For example, the following tables illustrate the updated information stored in the "position", "current location", and "registered mobile units" tables for the access points AP1 and AP2 at time t2.

| AP1: Time t2 Position | |
|---|---|
| Device | Position |
| AP2 | T1, B1, T2 |
| AP3 | T1, B1, T2, B3, T4 |
| AP4 | T1 |
| . | . |
| . | . |
| . | . |
| HOST | T1, B1, T2, B2, T3 |
| REGISTER | T1, B1, T2, B2, T3 |

| Current Location | |
|---|---|
| Device | Location |
| MU1 | T1, B1, T2 |
| MU2 | Registered |
| MU3 | T1 |
| MU4 | T1, B1, T2, B2, T3 |
| . | . |
| . | . |

| Registered Mobile Units |
|---|
| MU2 |

| AP2: Time t2 Position | |
|---|---|
| Device | Position |
| AP1 | T2, B1, T1 |
| AP3 | T2, B3, T4 |
| AP4 | T2, B1, T1 |
| . | . |
| . | . |
| HOST | T2, B2, T3 |
| REGISTER | T2, B2, T3 |

| Current Location | |
|---|---|
| Device | Location |
| MU1 | Registered |
| MU2 | T2, B1, T1 |
| MU3 | T2, B1, T1 |
| MU4 | T2 |
| . | . |
| . | . |

| Registered Mobile Units |
|---|
| MU1 |

As expected, the contents of the "position" table for each of the access points has not changed since each of the devices listed therein remain in their original location. However, the "registered mobile units" table in the access point AP1 no longer identifies the mobile unit MU2 as being registered. In addition, the "current location" table of the access point AP1 no longer indicates that the mobile unit MU1 is registered. Instead, the "current location" table now includes in relation to mobile unit MU1 the location of the access point AP2 with which the mobile unit MU1 is currently registered. As will be appreciated, the location is relative to the access point AP1. As a result, if the access point AP1 receives a misrouted packet destined to mobile unit MU1 which is no longer registered, the access point AP1 can replace the source routing information of the misrouted packet with the source routing information for the mobile unit MU1 contained in the "current location" table. This allows the misrouted information packet to be re-routed to the access point AP2 to which the mobile unit MU1 is currently registered as is explained more fully below.

The "current location" table for the access point AP2 at time t2 also has been updated to indicate that the mobile unit MU1 is now currently registered. Likewise, the "registered mobile units" table has been updated in the same manner. It will be appreciated that in actual implementation the "registered mobile units" table can actually be part of the "current location" table to the extent the information is redundant.

FIG. 6 represents the system 30 at time t3 (following time t2, for example). In this instance, the mobile unit MU1 has now registered with the access point AP3 on token ring T4. The contents of the tables for the access points AP1 and AP2 at time t3 are now represented by the following:

| AP1: Time t3 Position | |
|---|---|
| Device | Position |
| AP2 | T1, B1, T2 |
| AP3 | T1, B1, T2, B3, T4 |
| AP4 | T1 |
| . | . |
| . | . |
| . | . |
| HOST | T1, B1, T2, B2, T3 |
| REGISTER | T1, B1, T2, B2, T3 |

| Current Location | |
|---|---|
| Device | Location |
| MU1 | T1, B1, T2, B3, T4 |
| MU2 | Registered |
| MU3 | T1 |
| MU4 | T1, B1, T2 |
| . | . |
| . | . |
| . | . |

| Registered Mobile Units |
|---|
| MU2 |

| AP2: Time t3 Position | |
|---|---|
| Device | Position |
| AP1 | T2, B1, T1 |
| AP3 | T2, B3, T4 |
| AP4 | T2, B1, T1 |
| . | . |
| . | . |
| HOST | T2, B2, T3 |
| REGISTER | T2, B2, T3 |

| Current Location | |
|---|---|
| Device | Location |
| MU1 | T2, B3, T4 |
| MU2 | T2, B1, T1 |
| MU3 | T2, B1, T1 |
| MU4 | T2 |
| . | . |
| . | . |
| . | . |

| Registered Mobile Units |
|---|

The "current location" tables for the access points AP1 and AP2 have each been updated and now identify the location of the mobile unit MU1 as being the access point AP3. Similarly, the "registered mobile units" table of the access point AP2 has been updated to no longer identify the mobile unit MU1 as being registered.

Finally, FIG. 7 illustrates an example where the mobile unit MU1 at time t4 is currently registered with the access point AP4 on token ring T1 and, again, the location/registration of everything else remains the same. As will be appreciated based on the above description, the respective tables for the access points AP1 and AP2 can be represented as follows:

| AP1: Time t4 Position | |
|---|---|
| Device | Position |
| AP2 | T1, B1, T2 |
| AP3 | T1, B1, T2, B3, T4 |
| AP4 | T1 |
| . | . |
| . | . |
| HOST | T1, B1, T2, B2, T3 |
| REGISTER | T1, B1, T2, B2, T3 |

| Current Location | |
|---|---|
| Device | Location |
| MU1 | T1 |
| MU2 | Registered |
| MU3 | T1 |
| MU4 | T1, B1, T2, B2, T3 |
| . | . |
| . | . |
| . | . |

| Registered Mobile Units |
|---|
| MU2 |

| AP2: Time t4 Position | |
|---|---|
| Device | Position |
| AP1 | T2, B1, T1 |
| AP3 | T2, B3, T4 |
| AP4 | T2, B1, T1 |
| . | . |

-continued

| | |
|---|---|
| . | . |
| . | . |
| HOST | T2, B2, T3 |
| REGISTER | T2, B2, T3 |

Current Location

| Device | Location |
|---|---|
| MU1 | T2, B1, T1 |
| MU2 | T2, B1, T1 |
| MU3 | T2, B1, T1 |
| MU4 | T2 |
| . | . |
| . | . |
| . | . |

Registered Mobile Units

Consequently, it will be appreciated that the maintenance of the "current locations" tables in each access point 42 provides a manner by which misrouted information packets can be redirected to the access point 42 with which the particular mobile unit is currently registered. In view of the above mentioned overview of the operation of the system 30 in accordance with the invention, the specific operation of each of the devices will now be described in relevant part with reference to the flowcharts in FIGS. 9–17.

Beginning with FIG. 9, the details of the process in which each mobile unit MU registers with a particular access point 42 will now be explained. Beginning in step 100, the mobile unit processor 70 (FIG. 4) begins executing a registration routine. Such routine is initiated when the mobile unit is first powered up, for example. In step 102, the processor 70 broadcasts a "find router" packet via the RF section 78 to any access points 42 available to receive the broadcast. The "find router" packet includes information indicating to any access points which are within receiving range of the broadcast that the particular mobile unit is seeking to register with an access point. The access points which receive the packet, in turn, are programmed to transmit a "router identification" packet to any mobile units 42 from which they receive a "find router" packet. These "router identification" packets include information as to the identity of the access point, the amount of use (or "load") on the access point, and an indication of the relative location of the access point in the network 32.

In step 104, the processor 70 within the mobile unit MU determines whether any "router identification" packets have been received from any access points 42 via the RF section 78 within a predetermined period of time. If not, the processor 70 returns to step 102 and again transmits a "find router" packet. If the processor 70 determines that it did receive one or more "router identification" packets in step 104, the processor 70 proceeds to step 106 in which it stores in the memory 76 all of the "router identification" packets received during the predetermined time. Next, in step 108, the processor 70 is programmed to evaluate the packets according to a predetermined criteria in order to select an access point 42 with which to register. Such predetermined criteria may be based on, for example, which access point 42 exhibits the smallest load. Alternatively, the processor 70 may select the access point which is located in a particular relative location in the network 32. In another embodiment, the processor 70 may select an access point based on a combination of the criteria or based on some other criteria. The particular manner in which the mobile unit MU selects an access point 42 with which to register is not critical to the invention as will be appreciated.

In step 110, the processor 70 transmits a registration request packet directly to the selected access point 42 via the RF section 78. In step 112, the processor 70 determines whether an acknowledgement packet is received via the RF section 78 from the selected access point 42. As is described in connection with FIG. 10, each access point 42 is programmed to transmit a registration request acknowledgement to a requesting mobile unit MU in the event the mobile unit is permitted to register. If, in step 112, the processor 70 determines that the registration request was not acknowledged, the processor 70 returns to step 108 and selects another potential access point with which to attempt to register. If there are no other access points 42 from which a "router identification" has be received, the processor 70 is programmed to return to step 102 (not shown). In the event the processor 70 does receive a registration request acknowledgement in step 112, the processor 70 proceeds to step 114 whereby the mobile unit MU now considers itself registered with the selected access point 42.

As the mobile unit MU remains registered to a particular access point, the mobile unit MU will continue to receive transmissions from the access point 42 indicating that the mobile unit is still within range of the access point. Such transmissions may be in the form of acknowledgements of the receipt of information packets from the mobile unit MU. In the event the mobile unit has been idle and has not transmitted information to the access point 42 for over a predetermined period of time or vice versa, the processor 70 is preferably programmed to send out an inquiry requesting that the access point 42 transmit an acknowledgement informing the mobile unit that it is still within range of the access point 42. As will be expected, the mobile unit MU may change location and eventually fall out of range of the access point. Alternatively, transmission conditions may change (due to obstructions or the like) such that the mobile unit is no longer within range of the access point.

Therefore, in step 116 the processor 70 is programmed to determine whether packets from the mobile unit MU are still being acknowledged by the access point 42. If yes, the processor 70 returns to step 114 as shown and the mobile unit MU remains registered. If no, the processor 70 proceeds to step 118 in which it is considered that the mobile unit MU is out of range and no longer validly registered with the access point 42. Consequently, the processor 70 returns to the beginning of the registration routine and step 102 as shown. Thereafter, the mobile unit MU repeats the above-described procedure in an effort to re-register with another access point.

Turning now to FIG. 10, the registration procedure from the perspective of each of the access points 42 will now be described beginning with step 120. The registration routine is executed by the processor 56 in the access point. In step 122, the processor 56 determines whether a "find router" packet has been received via the RF section 60 from a mobile unit as discussed above in connection with step 102 in FIG. 9. If not, the processor 56 executes a loop around step 122 until such time as a "find router" packet is received. When a "find router" packet is received in step 122, the processor 56 proceeds to step 124 whereby the access point 42 transmits a "router identification" via the RF section 50 as discussed above in connection with steps 104 and 106 in FIG. 9. The mobile unit MU will then send a registration request if it wishes to register with that particular access point 42. The processor 56 determines in step 126 whether it has received a registration request.

If a registration request is not received in step 126, the processor 56 returns to step 122. If a registration request is received, on the other hand, the processor 56 proceeds to step 128 in which it transmits a registration acknowledgement to the mobile unit MU via the RF section 60. Next, the processor 56 is programmed to create what is referred to as a new registration announcement in step 130 and to broadcast the announcement across the network 32 via the transceiver 52 and connector 50. The announcement takes the form of an information packet such as that shown in FIG. 8. The source address is the access point 42 with which the mobile unit MU has newly registered. The destination address is set to indicate that the information packet is to be broadcast across the entire network 32 using conventional token ring techniques. As a result, the new registration announcement will be received by each of the other access points 42 on the network 32. This new registration announcement is used specifically to inform the particular access point 42 with which the mobile unit MU was previously registered that the mobile unit MU is now registered to a new access point. Such procedure is explained in more detail below with respect to FIG. 13.

Concurrent with step 130, the processor 56 executes step 132 in which it updates the information in the "registered mobile units" and "current location" tables stored in the memory 58. More specifically, the processor 56 stores the identity of the newly registered mobile unit MU in the "registered mobile units" table. Similarly, the processor 56 sets a flag in the "current location" table indicating that the mobile unit MU is now registered.

The processor 56 proceeds from steps 130 and 132 to step 134 in which the access point broadcasts onto the network 32 an updated current location information packet to each of the other access points 42. More particularly, the processor 56 generates in memory 58 a current location information packet including data identifying all mobile units MU which are currently registered with the access point 42. Such information is readily obtained by the processor 56 from the "registered mobile units" table. The source address of the packet is that of the particular access point transmitting the information (e.g., AP1). The destination address is set according to conventional token ring techniques to indicate that the information packet is to be broadcast across the entire network 32. The packet data field includes the aforementioned data identifying which particular mobile units are currently registered to the particular access point 42 identified in the source field.

The actual location of the mobile units MU identified in the data field is derived in the preferred embodiment by way of the source routing information included in the source routing field of the broadcasted current location information packet. Generally speaking, it will be appreciated by those having ordinary skill in the art of token ring networks that the source routing information in a broadcast packet will be built up as it traverses the network 32. Hence, when the broadcast message containing the current location information is received by another access point 42, the source routing information within the packet will identify the path taken by the packet in order to reach its destination. Such build-up of the source routing information is a result of each bridge inserting its identity and the identity of adjoining token ring(s), as is well known in the art, into the source routing field as the packet is passed along the network 32. The exact manner in which the source routing information is built up in the source routing field in association with the information packets broadcast over the network 32 is conventional. As a result, additional detail is omitted.

As is explained in more detail below in connection with FIG. 12, the current location information packet is utilized by the receiving access points 42 to update their respective "current location" tables. It is also noted that the processor 56 in each access point 42 is programmed to broadcast its respective current location information packet continuously every predetermined period, e.g., every five seconds, beginning when the access point is first powered up. Thus, in the event there are no changes regarding which mobile units MU are registered to the access point, the processor 56 will continue to rebroadcast the same current location information packets every five seconds. The reason for such redundancy is to avoid errors due to lost packet as will be appreciated. If there is a change in the mobile units MU which are registered to the access point as determined in steps 120–134, the processor 56 will update the current location information packet in step 134 and begin broadcasting the updated packet every five seconds. Following step 134, the processor 56 returns to step 122 as shown.

Accordingly, it will be appreciated that each access point 42 on the network 32 periodically broadcasts a current location information packet to each of the other access points 42. As a result, each of the access points 42 continuously knows which access point 42 each of the mobile units MU is currently registered to. This allows a misrouted packet to be re-routed as is discussed below with reference to FIGS. 14 and 15.

The current location information packets broadcast by each of the access points 42 also serve another purpose in accordance with the preferred embodiment of the invention. More particularly, each access point 42 is programmed via its respective processor 56 to review non-broadcast information packets received on the network 32 only if the last token ring (i.e., the final ring destination) identified in the source routing information within the received packet is identical to the token ring on which the access point 42 is located. Hence, the processor 56 is programmed to compare the final ring destination included in the non-broadcast packet with the location of the access point itself.

In order that a given access point 42 will "know" its own location, the present invention utilizes the current location information packets so that the access point 42 can learn its location on the network 32. As will be appreciated, as soon as a given access point 42 is connected to the network 32, it will begin receiving current location information packets broadcast from other access points 42 on the network 32. Presumably, at least one other access point 42 will exist on a token ring within the network 32 which is different from the token ring on which the receiving access point 42 is located. Consequently, the current location information packet broadcast from the other access point will include source routing information in the source routing field which has been built up as mentioned previously. The processor 56 of the receiving access point 42 is programmed to detect the identity of the last token ring in the source routing information from such multi-ring broadcast. Such token ring happens to be the token ring on which the receiving access point 42 is located as will be appreciated. The processor 56 is programmed to store such location information in memory, and consequently the access point 42 "knows" its own location and is able to discern which information packets on its ring are to be reviewed.

Referring briefly to FIG. 11, a routine for updating the position table in each access point 42 will now be described. Starting at step 140, the processor 56 executes a routine in which it is continuously updating the contents of the position table stored in the memory 58. Basically, the access point 42 constructs the position information by analyzing the source routing information in information packets received by the access point 42. More specifically, in step 142 the processor 56 determines whether a packet has been received via the network 32. If not, the processor 56 continues to execute a loop around step 142. If a packet is received, the processor 56 proceeds to step 144 in which it notes the identity of the source based on the source address field in the information packet. In addition, the processor 56 notes the position of the source based on the source routing information in the source routing field. In the event the received packet includes a mobile unit MU in its source field, however, the processor 56 does not include such information in its position table and instead skips step 146 and proceeds back to step 142 (not shown).

Thus, for example, if the host computer 36 sends a packet to access point AP1, the source routing information in the packet will read T3, B2, T2, B1, T1. The processor 56 in access point AP1 recognizes that the packet is from the host computer 36 based on the source address field, and simply reverses the order of the source routing information and thereby identifies the location of the host computer relative to the access point AP1 as T1, B1, T2, B2, T3. Thereafter, the processor 56 proceeds to step 146 in which it uses the thus obtained information to update the device and position information in the "position" table stored in the memory 58. In the event it is the first time a packet has been received from a particular device, the processor 56 will create and store a new entry in the "position" table. On the other hand, if a device-already appears in the "position" table, the processor 56 will simply rewrite the entry with the position information obtained from the most-recent packet. Thus, if the location of a device changes the access points 42 will quickly learn of such change as soon as a packet is received from the relocated device. Similarly, if an access point 42 is newly added to the system 30, it will quickly build-up its "position" table. Following step 146, the processor 56 returns to step 142.

Accordingly, over time each access point 42 will build up a "position" table identifying the positions of the other devices in the system 30. Since each access point 42 broadcasts a current location information packet to each of the other access points in the network 32 every five seconds or so as discussed above in connection with step 134 (FIG. 10), each of the access points 42 will quickly "learn" the location of each of the other access points 42 in the network 32. Moreover, the access points 42 will consequently learn the current location of each of the mobile units MU serviced by the access points 42 by virtue of the information included in the current location information packets, Furthermore, as the respective access points 42 communicate with more and more devices (e.g., the host computer 36 or register 40), the complete contents of its "position" and "current location" tables will quickly be established.

Although the "position" table in the access points 42 is dynamic in the sense that it is able to learn in the preferred embodiment, it will be appreciated that the "position" table could instead be fixed and/or programmable in the event the locations of devices included therein remain constant.

FIG. 12 illustrates the routine executed by the processor 56 in each access point 42 in order to update the contents of the "current location" table, beginning in step 148. Following step 148, the processor 56 proceeds to step 150 where it checks whether a current location information packet has been received from one of the access points 42. If not, the processor 56 continues to loop through step 150. If yes, the processor 56 temporarily stores the packet in the memory 58 and proceeds to step 152. The processor 56 in step 152 reads the data in the data field of the current location information packet to determine which mobile unit locations are being updated. Next, in step 154 the processor 56 identifies the location of the mobile units MU identified in the data field by looking to the source routing information. As previously discussed above, by reversing the order of the source routing information in the broadcast current location information packet, the location of the mobile units MU relative to the receiving access point 42 can be ascertained. Thereafter, the processor 56 proceeds to step 156 in which it updates the mobile unit and location information in the "current location" table stored in the memory 58. If it is the first time location information on a mobile unit MU has been received by the access point, the processor 56 will create a new entry in the table. Otherwise, the processor 56 simply rewrites the old entry with the updated location information. Following step 156, the processor 56 returns to step 150.

Thus, each processor 56 in each of the access points 42 is updating the contents of its "current location" table in relation to each of the other access points every predetermined period (e.g., every five seconds).

Referring now to FIG. 13, shown is a flowchart describing the routine executed by the processor 56 for updating the contents of the "registered mobile units" table in each respective access point 42. Beginning in step 160 the processor 56 starts the routine and proceeds to step 162 in which the processor 56 checks whether a new registration announcement packet has been received from any other access point 42 via the network 32 (step 130 in FIG. 10). If not, the processor 56 continues to loop through step 162. If yes, the processor 56 proceeds to step 164 where it evaluates the identity of the newly registered mobile unit MU as represented in the data field. The processor 56 then checks the contents of the "registered mobile units" table in the memory 58 to determine if the mobile unit which has been newly registered to another access point is identified as being registered. If no, the processor 56 ignores the announcement and returns to step 162. If yes, the processor 56 is alerted to the fact that the particular mobile unit MU is no longer registered as it has registered with another access point. Hence, the processor 56 proceeds to step 166 in which it clears the identification of the previously registered mobile unit MU from the "registered mobile units" table. In this manner, the processor 56 in each access point 42 maintains a current listing of which mobile units are registered therewith. Following step 166, the processor 56 returns to step 162.

The manner in which each access point 56 is programmed to be able to reroute a misdirected packet will now be described with reference to FIGS. 14 and 15. The processor 56 begins the routine in step 180 and proceeds to step 182 where it determines whether a packet has been received by the access point 42 via the network 32. In the current embodiment, it will be appreciated that the access point in step 182 will receive any packet having as its final destination in the source routing field the token ring on which the access point 42 is located. If a packet is not received, the processor 56 loops back through step 182 until a packet is received. Upon detecting the receipt of a packet in step 182, the processor 56 proceeds to step 184 in which it reviews the destination of the packet as identified in the packet destination field. Next, the processor 56 determines in step 186 whether the destination of the packet is the access point itself. If yes, the processor 56 then processes the packet accordingly in step 188 and returns to step 182.

If, in step 186, the destination of the packet is not the access point itself, the processor 56 proceeds to step 190 in which the processor 56 determines whether the destination identified in the destination field is any one of the mobile units identified in the "current location" table for the access point. If not, it is determined that the packet is not destined for a mobile unit. The processor 56 proceeds to step 192 where it is determined that the packet is not relevant to the access point and the packet is thereafter ignored and the processor 56 returns to step 182.

If, on the other hand, the destination of the packet is a mobile unit MU as determined based on its inclusion in the "current location" table, the processor 56 continues to step 194. In step 194, the processor 56 checks the "registered mobile units" table to determine whether the mobile unit MU to which the packet is directed is currently registered to the access point. If yes, the processor 56 proceeds to transmit the packet to the designated mobile unit MU via the RF section 60 in step 196. If no, the possibility arises that the packet is misrouted. More specifically, one of two situations can be the case in step 194 if the mobile unit MU is not registered with the particular access point. First, it may be the case that the mobile unit MU was previously registered to that particular access point but has since changed location and registered with another access point. Another device on the network from which the packet originated, such as the host computer 36 or register 40 is not able to ascertain the new location of the mobile unit MU for the reasons described above. Consequently, the device may have misrouted the packet to the particular access point believing the mobile unit was still registered.

Alternatively, it may be the case that the particular access point 42 has copied the packet before another access point on the same token ring (to which the packet is properly routed) has had an opportunity to receive and to review the packet. Regardless of the case, the packet will be routed to the appropriate access point which is servicing the mobile unit MU as follows. Each token ring T1–T3 having an access point within the system 30 has an access point 42 which is referred to as the "master of the ring" or "ring master". The manner in which the ring master is elected is described below in connection with FIG. 16. Generally speaking, the ring master is given the responsibility of rerouting a misrouted packet in the event the packet is misrouted.

More specifically, in the event the mobile unit to which the packet is directed is not registered to the particular access point 42, the processor 56 proceeds from step 194 to step 198. In step 198, the processor 56 determines whether the access point has been elected ring master. If not, the processor 56 proceeds directly to step 192 in which the packet is thereafter ignored and the processor 56 returns to step 182.

If the processor 56 determines in step 198 that it has been elected ring master, the processor then proceeds to step 199 as shown in FIG. 15. In step 199, the processor 56 looks up the location of the mobile unit MU to which the packet is directed in the "current location" table of the access point. Next, in step 200 the processor 56 compares the current location of the access point with which the mobile unit MU is registered with the location of the access point 42 itself to determine if the mobile unit MU is registered with another access point 42 on the same token ring. If yes, the processor 56 proceeds directly to step 192 (FIG. 14) in which the access point ignores the packet. Since the packet is on the same ring as the access point with which the mobile unit MU is registered, the packet will eventually be copied directly by such access point (via steps 194 and 196). If, in step 200, the processor 56 determines that the mobile unit MU is not registered to an access point 42 on the same token ring, the packet is considered to be misrouted. Hence, the processor 56 proceeds to step 202 in which the processor 56 copies the packet into the memory 58. The processor 56 then proceeds to step 204 in which it creates a new packet in the memory 58 as follows. The source address of the new packet is the particular access point itself. The destination address of the new packet is the mobile unit MU to which the copied packet was initially addressed. The source routing field of the new packet is made up of the source routing information obtained from the "current location" table in step 202. The actual data contained in the new packet is the same as the data found in the original copied packet. The new packet also includes a "reroute" field which indicates that the packet is in the process of being rerouted. The reroute field itself is created so as to include the source address of the packet just received.

The processor 56 then proceeds to step 206 in which it transmits the new packet formed in step 204 back onto the network 32 via the transceiver 52. As will be appreciated, the new packet contains the same data as the originally received packet, but is now surely routed to the access point 42 to which the mobile unit MU is currently registered. Following step 206, the processor 56 returns to step 182 as shown in FIG. 14.

Referring now to FIGS. 16A–16B, the manner in which a ring master is elected for each token ring on the network which has an access point 42 will be described. The routine shown in FIGS. 16A–16B is again carried out by the processor 56 in each access point 42 beginning in step 210. Following step 210 when the access point is initially powered up, the processor 56 proceeds to step 212 in which it resets a timer value "TIME" to zero and clears a memory location nominally referred to as "MASTER". The timer is based on a system clock (not shown), and it proceeds to run upon being reset. Next, in step 214 the processor 56 checks whether the value of "TIME" is more than a predetermined period of time, such as thirty seconds. If more than the predetermined period of time has not passed since "TIME" was reset as determined in step 214, the processor 56 proceeds to step 216.

In step 216 the processor 56 determines whether a current location packet (step 134 in FIG. 10) has been received from another access point 42 via the network 32. If not, the processor 56 continues to execute through a loop around steps 214 and 216. When a current location packet has been received and "TIME" is less than thirty seconds, the processor 56 proceeds from step 216 to step 218 in which the processor 56 reviews the source routing information and source address in the packet. In particular, the processor 56 proceeds to step 220 in which the processor 56 determines whether the source routing information in the packet is indicative of a packet delivered by an access point 42 located on the same token ring as the subject access point. This can be accomplished most readily by programming the processor 56 to look at the source routing information to see if it includes only the ring to which the access point is connected. As mentioned above, the current location information packets are broadcast on the network 32. As the packets traverse the network 32 the source routing information within the packets is built up. Hence, only those packets which originated on the same token ring to which the access point is connected will have exclusively that particular token ring identified in the source routing field.

If, in step 220, the packet is determined not to originate from an access point on the same token ring, the processor 56 returns to step 214 as the information in the packet will not be useful in determining a ring master. On the other hand, if the packet is determined to originate on the same token ring, the processor 56 proceeds to step 222 where the processor 56 determines from the source address of the packet whether the access point 42 from which the packet originated has a higher address than the subject access point. More specifically, the use of the higher address is somewhat of an arbitrary criteria for determining which access point is the ring master. Each access point 42 has a unique address on the ring, the address of each access points 42 on the network 32 being programmable and complying with conventional token ring protocol.

In the event the subject access point in step 222 has an address which is higher in value than that which sent the packet, the processor 56 returns to step 214. Otherwise, the processor 56 proceeds to step 223 in which the processor 56 stores the source address of the access point which sent the packet in the memory location "MASTER". In the event a source address had previously been stored, the processor 56 stores the source address which is highest. Thereafter, the processor 56 returns to step 214.

Eventually, "TIME" will be greater than thirty seconds as determined in step 214, and the processor 56 will proceed to step 224 in which the processor 56 reads the memory location "MASTER" to determine if it is still clear. If yes, it is concluded that there are no other access points on the same token ring which have a higher source address. Consequently, the processor 56 proceeds to step 226 in which it declares that particular access point the master of the ring. If, on the other hand, the memory location "MASTER" in step 224 is not clear, the processor 56 proceeds to step 228 in which it identifies the access point having the source address stored in the memory location "MASTER" as being the master. Following both steps 226 and 228, the processor 56 proceeds to step 230 as shown in FIG. 16B.

Step 230 begins a routine for ensuring that there has not been a change in the ring master, for example, because of a ring master being removed from the network 32 or breaking down. In step 230, a timer "T" is reset to zero. Next, in step 232, an access point which is not the master waits to receive current location information packets from access points on its own token ring (as identified by the lack of any other source routing information built up in the source routing field). In step 234, the processor 56 in the non-elected access point determines if a current location information packet has been received from the master access point (as determined by the packet having a source address equal to the source address stored in the memory location "MASTER") within the last thirty seconds (i.e., T=30 sec.). If yes, the processor 56 proceeds to step 236 in which the timer T is reset to zero. The processor 56 then returns to step 232. Otherwise, if the master access point is not heard from for over thirty seconds as determined in step 234, the processor 56 returns to step 212 (FIG. 16A) in order to repeat the election process.

It will be appreciated that there are a variety of ways in which a ring master can be determined, and the present invention is in no way limited to a particular determination criteria. Nor is the invention limited to the use of a ring master. For example, FIG. 17 is a flowchart describing another manner in which a misrouted packet is rerouted to the proper access point 42. The various steps shown in FIG. 17 replace steps 182–198 shown in FIG. 14, and together with the steps shown in FIG. 15 combine to represent a different embodiment. In this embodiment, those mobile units MU which are registered to each particular access point 42 are considered to exist on their own token ring. For example, those mobile units MU which are registered to access point AP1 are considered within the system 30 to be on token ring T5. Those mobile units MU which are registered to access point AP2 are considered to be on token ring T6, and so on. At the same time, each access point 42 is nominally associated with its own bridge address. For example, access point AP1 is represented as bridge B4, access point AP2 is represented as bridge B5, and so on.

Thus, for example, the source routing information for a packet which is sent from the host computer 36 to mobile unit MU1 in FIG. 2 would ideally be T3, B2, T2, B1, T1, B4, T5. Thus, according to this protocol access points 42 within the network 32 will process packets only if the final routing destination in the source routing field is the token ring on which the access point is located, or is the token ring associated with the mobile units MU serviced by that particular access point.

With this in mind, following step 180 the processor 56 in each access point 42 determines whether a packet has been received as represented in step 240. If a packet is not received, the processor 56 will continue to loop through step 240 until a packet is received. If a packet is determined to have been received in step 240, the processor 56 continues to step 242 in which the processor determines whether the packet is addressed to the respective mobile unit token ring serviced by the access point (e.g., ring T5 in the case of access point AP1). If no, the processor 56 proceeds to step 244 in which it determines whether the destination of the received packet as identified in the destination field is the access point itself. If yes, the processor 56 proceeds to step 246 and the appropriate normal processing of the packet takes place. If not, the packet is ignored by the access point in step 248. Following both steps 246 and 248, the processor 56 returns to step 240.

In the event the packet received in step 240 is addressed to the mobile unit token ring as determined in step 242, the processor 56 then goes to step 250. In step 250, the processor 56 reviews its "registered mobile units" table to determine whether the mobile unit MU identified in the destination field of the packet is currently registered to the subject access point. As will be appreciated, any packet which is directed to the token ring associated with the mobile units should be destined to one of the mobile units. If yes in step 250, the processor 56 proceeds to step 252 in which it transmits the packet to the registered mobile unit MU via its RF section. Alternatively, if in step 250 it is determined that the mobile unit is not currently registered, the packet is considered misrouted. Consequently, the processor 56 continues to step 200 as shown in FIG. 15. Thereafter, the processor 56 creates a new packet as described above in connection with steps 200–206, and reroutes the misrouted packet to the proper access point 42 based on the information in the "current location" table. The processor then returns to step 240 shown in FIG. 17.

It will be appreciated that each of the various routines described herein as being executed by the processors in the mobile units and access points are run substantially continuously and concurrently by the respective devices such that the various functions are continuously being carried out. In this manner, as mobile units roam about the network 32 information is always being updated and packets are being rerouted when necessary. The various routines are started basically when the mobile units and access points are powered up and continue to run as overhead maintenance operations while the network is used for its intended purpose such as inventory control, maintaining patient information, etc.

There may be rare instances in which a packet may tend to be rerouted more than once. To protect against such an occurrence, the access points 42 are preferably programmed to detect a packet that has already been rerouted by way of the aforementioned "reroute" field created in step 204 (FIG. 15). Upon receiving a packet including a reroute field, the access points are programmed to not reroute the packet further so as to avoid a rerouted packet becoming tied up in the network 32.

Also, it will be appreciated that the access points 42 are preferably programmed to review only those non-broadcast information packets which are destined for their particular ring. This is done in order to ensure that only the master access point on a single ring attempts to reroute a misrouted packet.

The situation is likely to arise where a mobile unit MU is suddenly powered down, damaged, or otherwise removed from the system 30, at least temporarily. Information packets destined for the mobile unit MU from the host computer 36 or other network device will eventually be routed to the access point 42 with which the mobile unit MU was last registered. That access point 42 will attempt to transmit the information packets to the mobile unit MU (step 196, FIG. 14) since the mobile unit MU still is listed as being registered in the "registered mobile units" table. However, the access point 42 will not receive an acknowledgement from the mobile unit MU as would conventionally be provided so as to indicate that the information packet was received. In the preferred embodiment, the processor 56 in the access point 42 is programmed to identify this circumstance as a case of the mobile unit MU no longer being available in the system 30. In this event, the processor 56 is programmed to store temporarily the undelivered packet(s) in the memory 58.

Eventually, when the mobile unit MU is powered back up or otherwise returns to the system 30 either with the same access point 42 or a new access point, the processor 56 is programmed to detect such return based on the registered procedure of FIG. 10 or the current location information packet (step 134) broadcast by the new access point 42. The processor 56 thereby learns the location of the returning mobile unit MU and transmits the packet(s) stored in the memory 58 to the appropriate location. In the event the returning mobile unit MU has registered with a new access point 42, the processor 56 is programmed to clear the mobile unit MU from its own "registered mobile units" table together with updating its "current location" table in response to the receipt of the current location information packet from the new access point 42 following the undelivered packet(s). The memory 58 preferably is used to store undelivered packet(s) for at least a predetermined period of time before clearing the packet(s) in order to preserve available memory space as will be appreciated.

In view of the above disclosure, it will be appreciated that the present invention provides a network communication system in which access points providing wireless access to the system can reroute misrouted information packets in the event the location of a mobile unit has changed. Regardless of whether a host computer or other network device is capable of updating in its position table the changing locations of the mobile units, information packets directed to the mobile units from the host computer or other network device are still properly delivered.

The access points 42 within the system 30 handle all of the rerouting functions. This obviates the need to reconfigure and/or replace the larger, more expensive components in the conventional systems such as the host computer 36 or any other devices which will need to communicate with the mobile units. By simply connecting the access points 42 to a node 34 on the network 32, the access points 42 will automatically learn the locations of the other devices with which they communicate. In addition, the access points 42 will attend to rerouting misrouted packets as described herein.

Although the invention has been shown and described with respect to certain preferred embodiments, it is obvious that equivalents and modifications will occur to others skilled in the art upon the reading and understanding of the specification. For example, it will be apparent that the system 30 may include additional access points 42 which are not connected directly to the network 32. Rather, these access points 42 serve as repeater stations for servicing the mobile units at extended ranges. Nevertheless, the same principles of the invention can be accomplished by considering those mobile units serviced directly by a repeater station as being registered to the access point 42 which ultimately ties the mobile units into the network 32 at a given node 34.

Furthermore, the present invention is particularly useful for networks involving mobile units having wireless links. However, the invention also has application for wired networks in which devices may be readily connected and disconnected from one access point to another. Also, although the invention is described primarily using a radio link between the mobile units and the access points, it will be appreciated that other wireless connections can be used such as an optical link. For example, light emitting diodes and photodiodes can be used for transmitting and receiving signals, respectively.

Although the invention is described with reference to specific time periods (e.g., five seconds and thirty seconds) and particular criteria (e.g., the access point with the highest address), such criteria are considered only to be exemplary. Also, although specific registration routines are described in connection with the mobile units becoming registered with a particular access point, it will be appreciated that the invention is not concerned specifically with how a mobile unit is registered or otherwise serviced by a particular access point. As referred to generally herein and in the claims, a mobile unit is considered "registered" to a given access point by virtue of he fact that the given access point is responsible for wirelessly communicating with the mobile unit, regardless of whether or not there is a particular registration routine as exemplified herein.

The present invention includes all such equivalents and modifications, and is limited only by the scope of the following claims.

What is claimed is:

1. A network communication system, comprising:
   a communication network including a plurality of nodes; and
   a plurality of access points each coupled to said communication network at a respective one of said nodes, said access points serving as communication links between said communication network and one or more mobile communication units, each of said access points including:
   wireless communication means for communicating information between said respective node and any of said one or more mobile communication units which are registered to said access point;
   means for receiving an information packet from said communications network, said information packet being addressed to a particular one of said one or more mobile communication units;

means for transmitting said information packet to said particular mobile communication unit, via said wireless communication means, in the event said particular mobile communication unit is currently registered to said access point;

means for rerouting said information packet to said particular mobile communication unit via said communication network in the event said particular mobile communication unit is not currently registered to said access point;

means for storing information relating to the current location of each of said one or more mobile communication units; and means for communicating to each of the other access points which of the one or more mobile communication units are currently registered thereto, wherein said means for communicating automatically communicates said registration information periodically.

2. The system of claim 1, wherein said communication network comprises a token ring configuration.

3. The system of claim 1, wherein each of said access points comprises means for maintaining a table of which of said one or more mobile communication units are currently registered to said access point.

4. The system of claim 1, wherein said information relating to the current location of each of said one or more mobile communication units is derived based upon source routing information developed within the communication network.

5. The system of claim 1, wherein at least two of said access points are connected to said communication network in a token ring configuration, and said at least two access points include means for electing a ring master responsible for rerouting said information packet.

6. The system of claim 1, wherein said means for rerouting comprises means for providing source routing information.

7. The system of claim 1, wherein said wireless communication means comprises an RF transceiver.

8. The system of claim 1, wherein said wireless communication means comprises an optical transceiver.

9. In a network communication system comprising a communication network having a plurality of nodes, and a plurality of access points each coupled to said communication network at a respective one of said nodes, said access points serving as respective wireless communication links between said communication network and one or more mobile communication units registered thereto, a method of communicating an information packet including the steps of:

directing an information packet over said communication network to a particular one of said access points to which a particular one of said one or more mobile communication units is considered to be registered;

using said particular access point to transmit said information packet to said particular mobile communication unit via wireless communication in the event the particular mobile communication unit is currently registered therewith;

using one of said plurality of access points to reroute said information packet to said particular mobile communication unit via said communication network in the event said particular mobile communication unit is not currently registered to said particular access point, wherein said rerouting step includes the step of storing information relating to the current location of each of said one or more mobile communication units in each access point, each of said access points communicating to each of the other access points which of the one or more mobile communication units are currently registered thereto, wherein said access points each communicate said registration information periodically.

10. The method of claim 9, wherein said communication network comprises a token ring configuration.

11. The method of claim 9, wherein said rerouting step includes the step of maintaining for each access point a log of which of said one or more mobile communication units are currently registered to said access point.

12. The method of claim 2, wherein said information relating to the current location of each of said one or more mobile communication units is derived based upon source routing information developed within the communication network.

13. The method of claim 9, wherein at least two of said access points are connected to said communication network in a token ring configuration, one of said at least two access points being said particular access point towards which said information packet is directed, and further including the step of electing a ring master among said at least two access points such that said ring master is responsible for rerouting said information packet.

14. The method of claim 9, wherein said rerouting step comprises the step of inserting source routing information to reroute said information packet included in said information packet.

15. An access point for use in a network communication system comprising a communication network having a plurality of nodes, said access point together with a plurality of similar access points each which are coupled to said communication network at a respective one of said nodes, with each of said access points serving as a respective wireless communication link between said communication network and one or more mobile communication units registered thereto, said access point comprising:

wireless communication means for communicating information between said respective node and any of said one or more mobile communication units which are registered to said access point;

means for receiving an information packet from said communications network, said information packet being addressed to a particular one of said one or more mobile communication units;

means for transmitting said information packet to said particular mobile communication unit, via said wireless communication means, in the event said particular mobile communication unit is currently registered to said access point;

means for rerouting said information packet to said particular mobile communication unit via said communication network in the event said particular mobile communication unit is not currently registered to said access point;

means for maintaining a log of which of said one or more mobile communication units are currently registered to said access point;

means for storing information relating to the current location of each of said one or more mobile communication units; and means for communicating to each of the other similar access points which of the one or more mobile communication units are currently registered thereto, wherein said means for communicating automatically communicates said registration information periodically.

16. The access point of claim 15, wherein said information relating to the current location of each of said one or more mobile communication units is derived based upon source routing information developed within the communication network.

17. The access point of claim 15, wherein at least two of said access points are connected to said communication network in a token ring configuration, and said at least two access points include means for electing a ring master responsible for rerouting said information packet.

18. The access point of claim 15, wherein said means for rerouting comprises means for providing source routing information.

19. A network communication system comprising:
   (a) a communication network including a plurality of nodes;
   (b) a plurality of mobile data collection units; and
   (c) a plurality of access points each coupled to said communication network at a respective one of said nodes, operating to convey routed data packets between the communication network and a destination mobile data collection unit, each access point comprising:
      (1) a transmission system for wirelessly communicating one or more data packets to the destination mobile data collection unit in the event that the destination mobile data collection unit is within a wireless communication area;
      (2) a reroute system for communicating said data packets to the destination mobile data collection unit through the communication network in the event that the mobile unit is not within said wireless communication area, wherein the reroute system includes a current position table identifying route information used to reroute the data packets to the destination mobile data collection unit; and
      (3) means for communicating to each of the other access points which of the one or more mobile communication units are currently registered thereto, wherein said means for communicating automatically communicates said registration information periodically.

20. The network of claim 19, wherein each of said data packets includes route information in a routing field which identifies rings and bridges in a token ring network.

21. The network of claim 19, wherein in each of said data packets rerouted via the reroute system includes source routing information.

\* \* \* \* \*